(12) United States Patent
Kinigakis et al.

(10) Patent No.: US 6,941,722 B2
(45) Date of Patent: Sep. 13, 2005

(54) APPARATUS FOR MANUFACTURING FLEXIBLE PACKAGES HAVING SLIDE CLOSURES

(75) Inventors: Panagiotis Kinigakis, Buffalo Grove, IL (US); Orestes Rivero, Skokie, IL (US); Kenneth Pokusa, Willowbrook, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 16 days.

(21) Appl. No.: 10/660,260

(22) Filed: Sep. 11, 2003

(65) Prior Publication Data

US 2004/0045255 A1 Mar. 11, 2004

Related U.S. Application Data

(62) Division of application No. 09/836,984, filed on Apr. 18, 2001, now Pat. No. 6,675,558.

(51) Int. Cl.⁷ ............................. B65B 9/20; B65B 61/18
(52) U.S. Cl. ....................... 53/133.4; 53/551; 53/139.2; 493/213
(58) Field of Search ................................ 53/412, 133.4, 53/139.2, 551, 552; 29/408, 768; 493/213, 214

(56) References Cited

U.S. PATENT DOCUMENTS

| | | | |
|---|---|---|---|
| 3,534,520 A | 10/1970 | Moran | |
| 3,701,191 A | * 10/1972 | Laguerre | .................... 493/214 |
| 4,090,017 A | 5/1978 | McMahon et al. | |
| 4,355,494 A | 10/1982 | Tilman | |
| 4,516,268 A | 5/1985 | Kamp | |
| 4,534,158 A | 8/1985 | McClosky | |
| 4,586,319 A | 5/1986 | Ausnit | |
| 4,601,694 A | 7/1986 | Ausnit | |
| 4,617,785 A | 10/1986 | Chikatani et al. | |
| 4,646,511 A | 3/1987 | Boeckmann et al. | |
| 4,709,533 A | 12/1987 | Ausnit | |
| 4,727,709 A | 3/1988 | Zieke et al. | |
| 4,745,731 A | 5/1988 | Talbott et al. | |
| 4,812,074 A | 3/1989 | Ausnit et al. | |
| 4,848,064 A | 7/1989 | Lems et al. | |
| 4,878,987 A | 11/1989 | Ven Erden | |
| 4,894,975 A | 1/1990 | Ausnit | |
| 4,909,017 A | 3/1990 | McMahon et al. | |
| 4,945,714 A | 8/1990 | Bodolay et al. | |
| 5,010,627 A | 4/1991 | Herrington et al. | |
| 5,014,498 A | 5/1991 | McMahon | |
| 5,014,499 A | 5/1991 | Boekmann | |
| 5,036,643 A | 8/1991 | Bodolay | |
| 5,080,747 A | 1/1992 | Veix | |
| 5,088,971 A | 2/1992 | Herrington | |
| 5,127,208 A | 7/1992 | Custer et al. | |

(Continued)

FOREIGN PATENT DOCUMENTS

| | | |
|---|---|---|
| EP | 0 443 867 A1 | 8/1991 |
| EP | 1 164 087 A2 | 12/2001 |

(Continued)

OTHER PUBLICATIONS

U.S. Appl. No. 09/945,537, filed Aug. 30, 2001.
U.S. Appl. No. 09/945,557, filed Aug. 30, 2001.

(Continued)

*Primary Examiner*—John Sipos
(74) *Attorney, Agent, or Firm*—Fitch, Even, Tabin & Flannery

(57) ABSTRACT

Vertical form fill seal apparatus for making flexible packages with slider fastener closures is provided. A fastener track is applied in-line with a plastic web and is bonded thereto at the same time that a peel seal is formed. All package components are brought together at the point of fill. Prior to assembly at the fill station a series of spaced-apart stop members are formed along the fastener tracks.

25 Claims, 27 Drawing Sheets

U.S. PATENT DOCUMENTS

| | | |
|---|---|---|
| 5,131,121 A | 7/1992 | Herrington et al. |
| 5,167,107 A | 12/1992 | Terminella et al. |
| 5,179,816 A | 1/1993 | Wojnicki |
| 5,238,306 A | 8/1993 | Heintz et al. |
| 5,247,781 A | 9/1993 | Runge |
| 5,322,579 A | 6/1994 | Van Erden |
| 5,400,565 A | 3/1995 | Terminella et al. |
| RE34,905 E | 4/1995 | Ausnit |
| 5,417,035 A | 5/1995 | English |
| 5,505,037 A | 4/1996 | Terminella et al. |
| 5,519,982 A | 5/1996 | Herber et al. |
| 5,561,966 A | 10/1996 | English |
| 5,564,259 A | 10/1996 | Stolmeier |
| 5,664,406 A | 9/1997 | Smith |
| 5,682,730 A | 11/1997 | Dobreski |
| 5,687,549 A | 11/1997 | Jostler et al. |
| 5,733,045 A | 3/1998 | Jostler et al. |
| 5,743,070 A | 4/1998 | Lerner et al. |
| 5,746,043 A | 5/1998 | Terminella et al. |
| 5,768,852 A | 6/1998 | Terminella et al. |
| 5,776,045 A | 7/1998 | Bodolay et al. |
| 5,826,401 A | 10/1998 | Bois |
| 5,845,465 A | 12/1998 | Bennett |
| 5,845,466 A | 12/1998 | Laudenberg |
| 5,884,452 A | 3/1999 | Bois |
| 5,904,425 A | 5/1999 | May |
| 5,906,438 A | 5/1999 | Laudenberg |
| 5,930,983 A | 8/1999 | Teminella et al. |
| 5,937,615 A | 8/1999 | Forman |
| 5,938,337 A | 8/1999 | Provan et al. |
| 5,956,924 A | 9/1999 | Thieman |
| 5,983,594 A | 11/1999 | Forman |
| 6,000,197 A | 12/1999 | Ausnit |
| 6,029,428 A | 2/2000 | Terminella et al. |
| 6,044,621 A | 4/2000 | Malin et al. |
| 6,047,450 A | 4/2000 | Machacek et al. |
| 6,047,521 A | 4/2000 | Terminella et al. |
| 6,071,011 A | 6/2000 | Thomas et al. |
| 6,131,369 A | 10/2000 | Ausnit |
| 6,131,370 A | 10/2000 | Ausnit |
| 6,138,436 A | 10/2000 | Malin et al. |
| 6,138,439 A | 10/2000 | McMahon et al. |
| 6,139,662 A | 10/2000 | Forman |
| 6,148,588 A | 11/2000 | Thomas et al. |
| 6,161,271 A | 12/2000 | Schreiter |
| 6,178,722 B1 | 1/2001 | McMahon |
| 6,182,337 B1 * | 2/2001 | Machacek et al. ............ 24/400 |
| 6,185,907 B1 | 2/2001 | Malin et al. |
| 6,199,351 B1 | 3/2001 | Mount |
| 6,209,287 B1 | 4/2001 | Thieman |
| 6,212,857 B1 | 4/2001 | Van Erden |
| 6,216,423 B1 | 4/2001 | Thieman |
| 6,219,993 B1 | 4/2001 | Linkiewicz |
| 6,244,021 B1 | 6/2001 | Ausnit et al. |
| 6,244,746 B1 | 6/2001 | Tokita et al. |
| 6,286,189 B1 | 9/2001 | Provan et al. |
| 6,292,986 B1 | 9/2001 | Provan et al. |
| 6,293,896 B1 | 9/2001 | Buchman |
| 6,327,745 B1 | 12/2001 | Belmont et al. |
| 6,327,837 B1 | 12/2001 | Van Erden |
| 6,350,340 B1 * | 2/2002 | Johnson ..................... 53/133.4 |
| 6,360,513 B1 | 3/2002 | Strand et al. |
| 6,363,692 B2 | 4/2002 | Thieman |
| 6,364,530 B1 | 4/2002 | Buchman |
| 6,389,780 B1 | 5/2002 | Coomber et al. |
| 6,412,254 B1 | 7/2002 | Tilman et al. |
| 6,427,421 B1 | 8/2002 | Belmont et al. |
| 6,438,926 B1 | 8/2002 | Thieman |
| 6,449,924 B2 | 9/2002 | McMahon et al. |
| 6,470,551 B1 | 10/2002 | Provan et al. |
| 6,474,045 B2 | 11/2002 | McMahon et al. |
| 6,477,821 B1 | 11/2002 | Bois |
| 6,481,183 B1 | 11/2002 | Schmidt |
| 6,488,410 B2 * | 12/2002 | Schneider ..................... 53/412 |
| 6,499,272 B2 | 12/2002 | Thieman |
| 6,715,262 B2 * | 4/2004 | Malin et al. .................. 53/412 |
| 2001/0001164 A1 | 5/2001 | Van Erden |
| 2001/0017950 A1 | 8/2001 | Strand et al. |
| 2001/0039235 A1 | 11/2001 | Buchman |
| 2001/0039783 A1 | 11/2001 | McMahon et al. |
| 2001/0042357 A1 | 11/2001 | McMahon et al. |
| 2001/0045083 A1 | 11/2001 | McMahon et al. |
| 2001/0053253 A1 | 12/2001 | Buchman |
| 2002/0017078 A1 | 2/2002 | Thieman |
| 2002/0064321 A1 | 5/2002 | May |
| 2002/0064322 A1 | 5/2002 | May |
| 2002/0068668 A1 | 6/2002 | Chow et al. |
| 2002/0118896 A1 | 8/2002 | Forman |
| 2002/0134046 A1 | 9/2002 | Bois |
| 2002/0134050 A1 | 9/2002 | Thieman |
| 2002/0150313 A1 | 10/2002 | Bois |
| 2002/0152719 A1 | 10/2002 | Kinigakis et al. |
| 2002/0152720 A1 | 10/2002 | Kinigakis et al. |
| 2002/0173414 A1 | 11/2002 | Leighton |
| 2002/0178556 A1 | 12/2002 | McMahon et al. |
| 2002/0184858 A1 | 12/2002 | Ausnit et al. |
| 2002/0194818 A1 | 12/2002 | Thieman |

FOREIGN PATENT DOCUMENTS

| | | |
|---|---|---|
| JP | 55-89068 | 7/1980 |
| JP | 61-259959 | 11/1986 |
| JP | 01-226556 | 9/1989 |
| JP | 04-173510 | 6/1992 |
| JP | 4-215954 | 8/1992 |
| JP | 5-91909 | 4/1993 |
| JP | 5-91910 | 4/1993 |
| JP | 7-112746 | 5/1995 |
| JP | 7-187202 | 7/1995 |
| JP | 9-216642 | 8/1997 |
| JP | 10-706 | 1/1998 |
| JP | 10-501714 | 2/1998 |
| JP | 10-503672 | 4/1998 |
| JP | 10-147352 | 6/1998 |
| JP | 10203539 A | 8/1998 |
| JP | 11-20051 | 1/1999 |
| JP | 11157553 A | 6/1999 |
| JP | 11-314648 | 11/1999 |
| WO | WO 98/24704 | 6/1998 |
| WO | WO 98/45180 | 10/1998 |
| WO | WO 01/96195 A1 | 12/2001 |

OTHER PUBLICATIONS

U.S. Appl. No. 09/994,105, filed Nov. 26, 2001.
U.S. Appl. No. 10/099,741, filed Mar. 15, 2002.
U.S. Appl. No. 10/155,401, filed May 23, 2002.
U.S. Appl. No. 10/174,614, filed Jun. 19, 2002.
U.S. Appl. No. 10/251,639, filed Sep. 20, 2002.
U.S. Appl. No. 10/280,335, filed Oct. 25, 2002.
U.S. Appl. No. 10/363,436, filed Jan. 29, 2003.

* cited by examiner

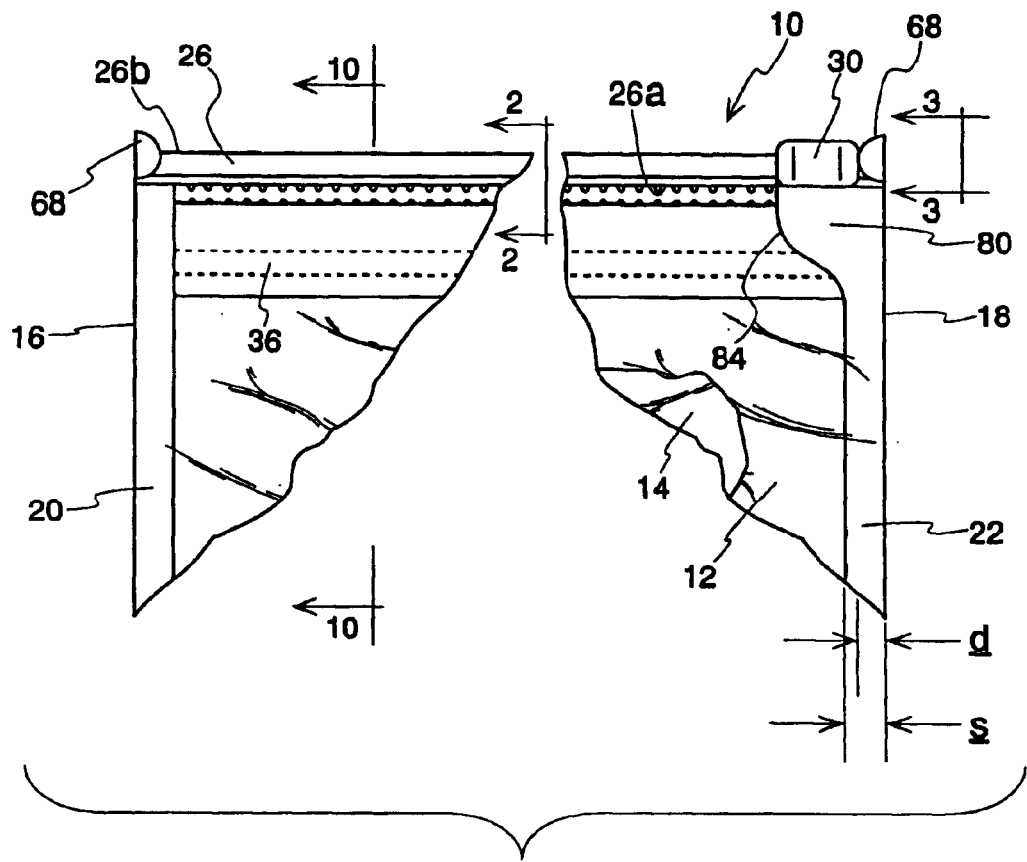
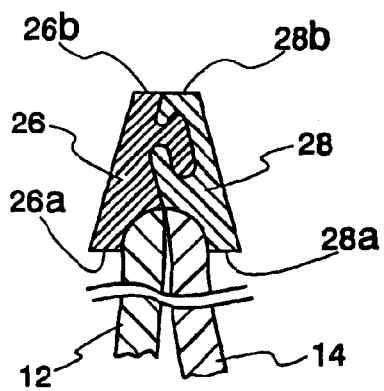
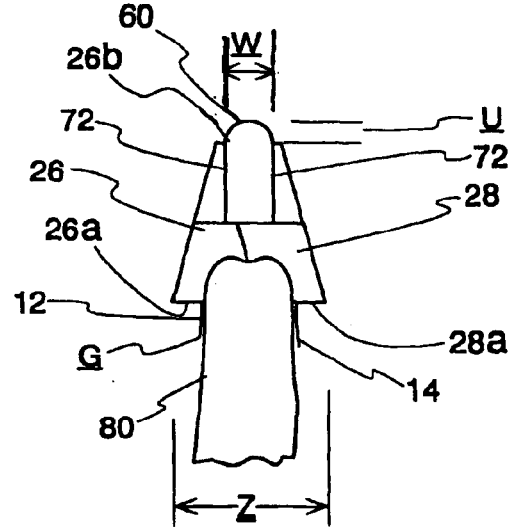
Fig. 1
Fig. 2
Fig. 3

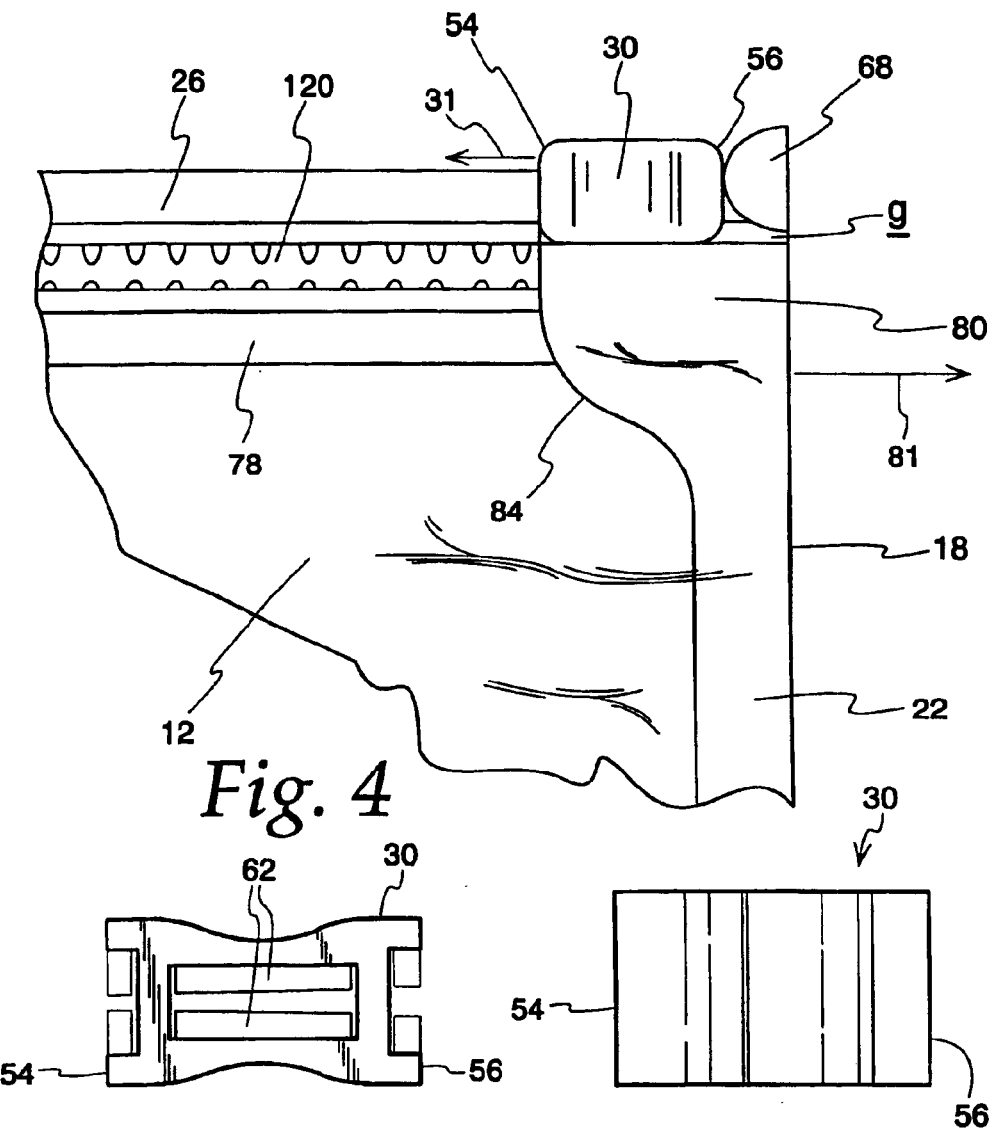
Fig. 4
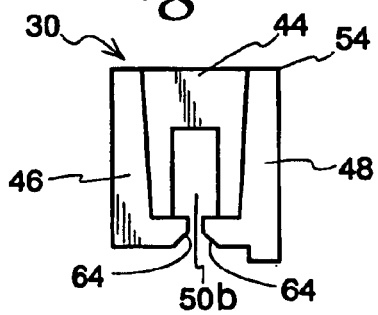
Fig. 5
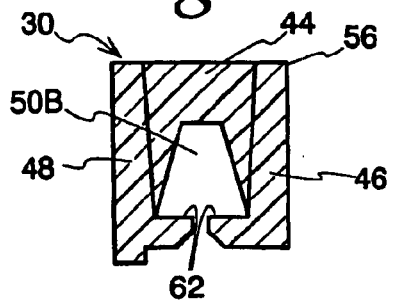
Fig. 6
Fig. 7
Fig. 8

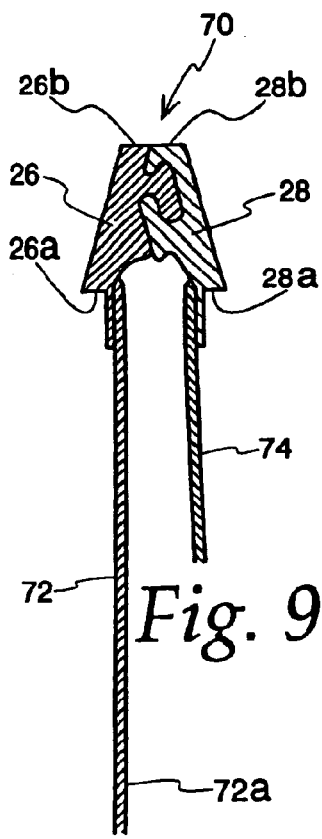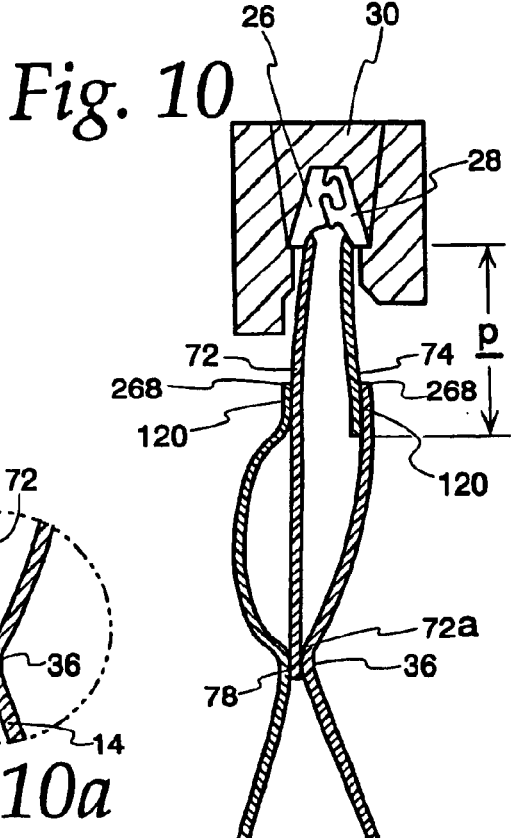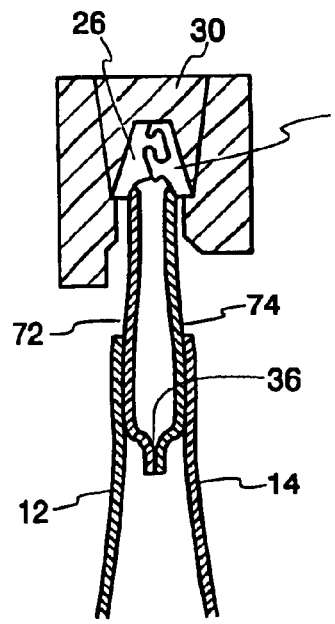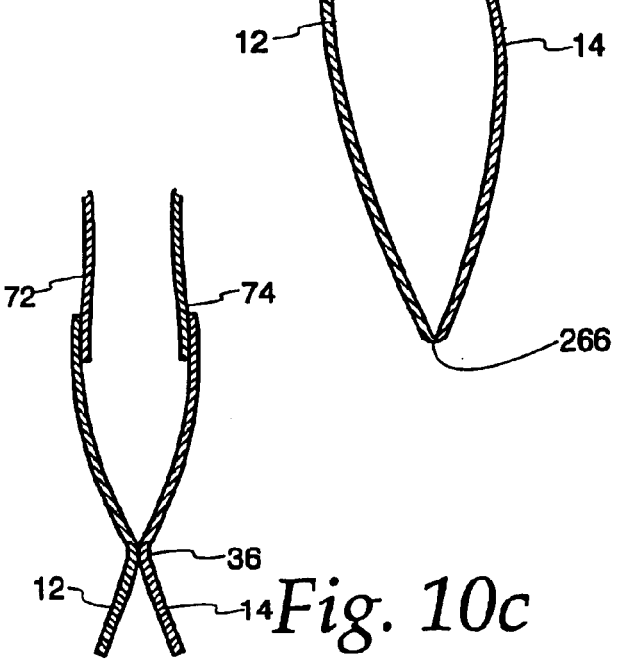

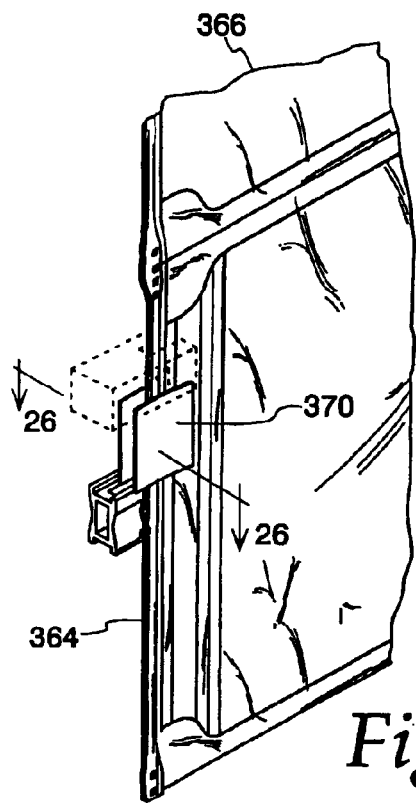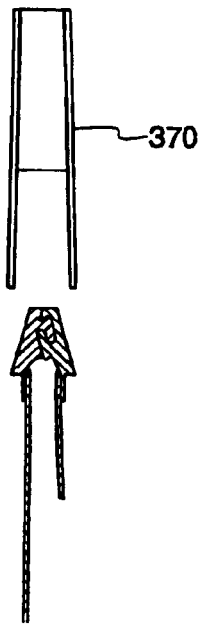
Fig. 25   Fig. 26
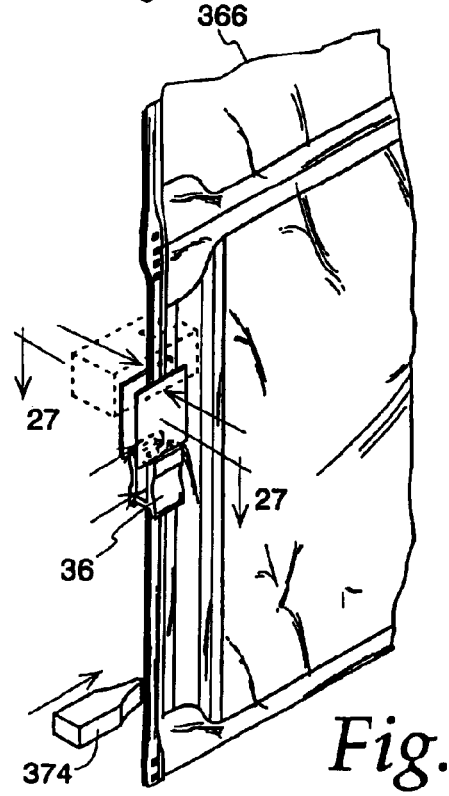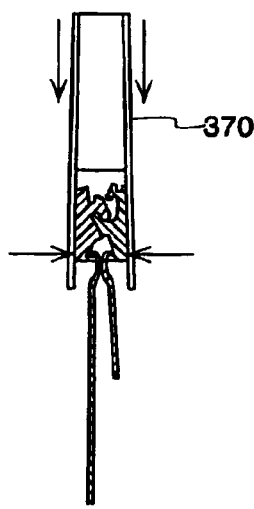
Fig. 27
Fig. 28

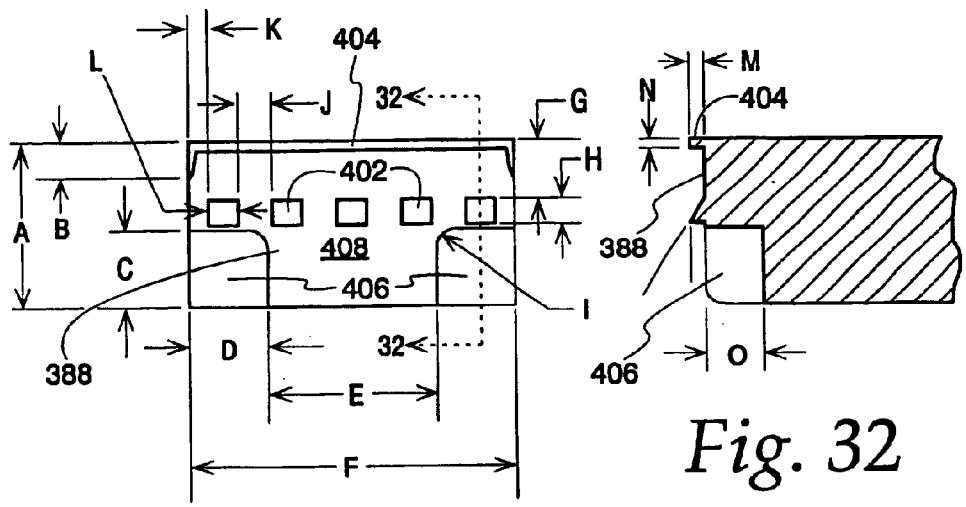
*Fig. 31*
*Fig. 32*
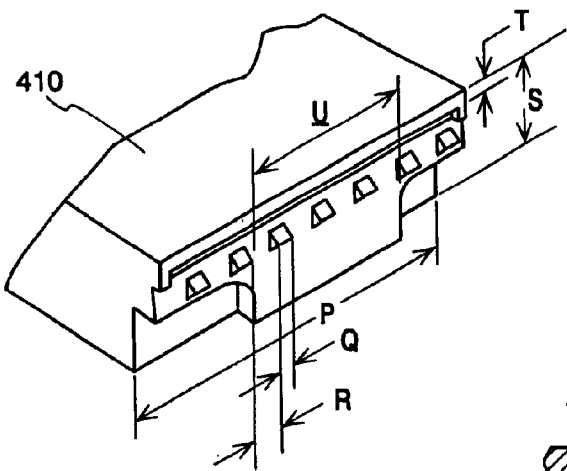
*Fig. 33*
PRIOR ART
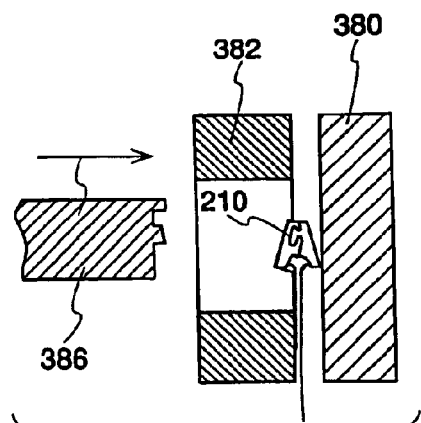
*Fig. 34*

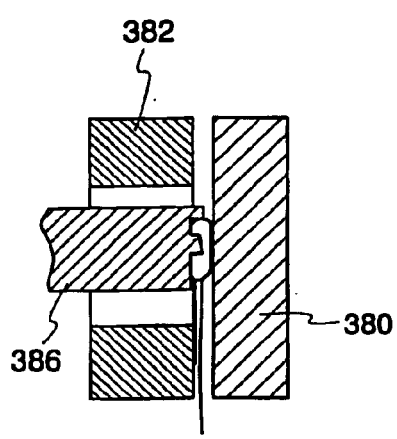
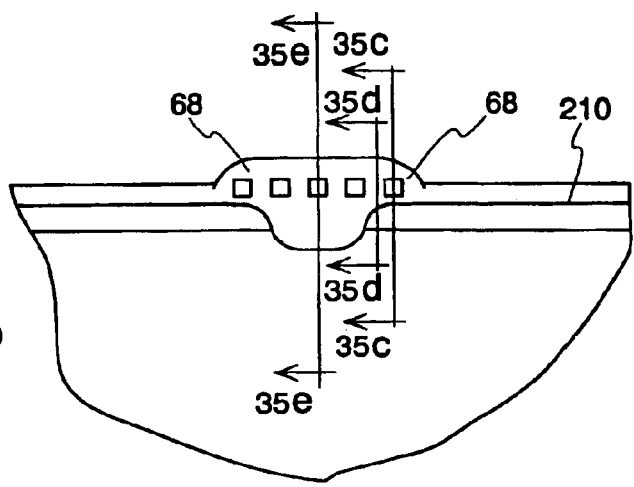
Fig. 35a
Fig. 35b
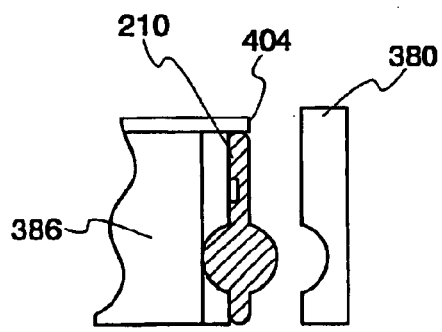
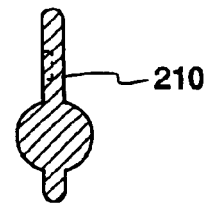
Fig. 35c
Fig. 35d
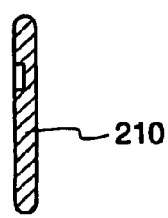
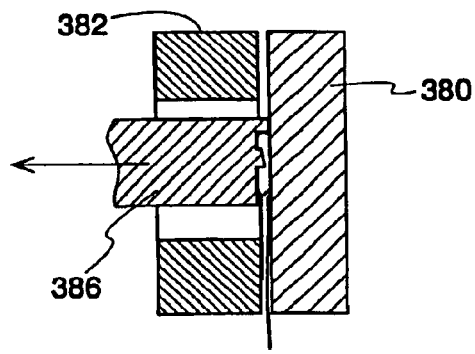
Fig. 35e
Fig. 35f

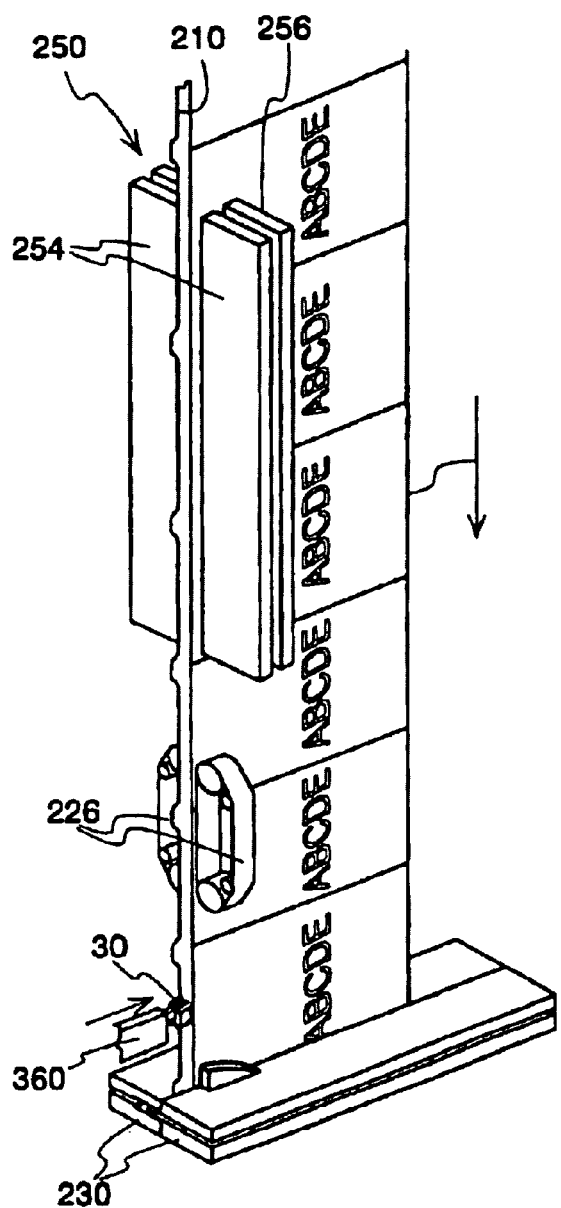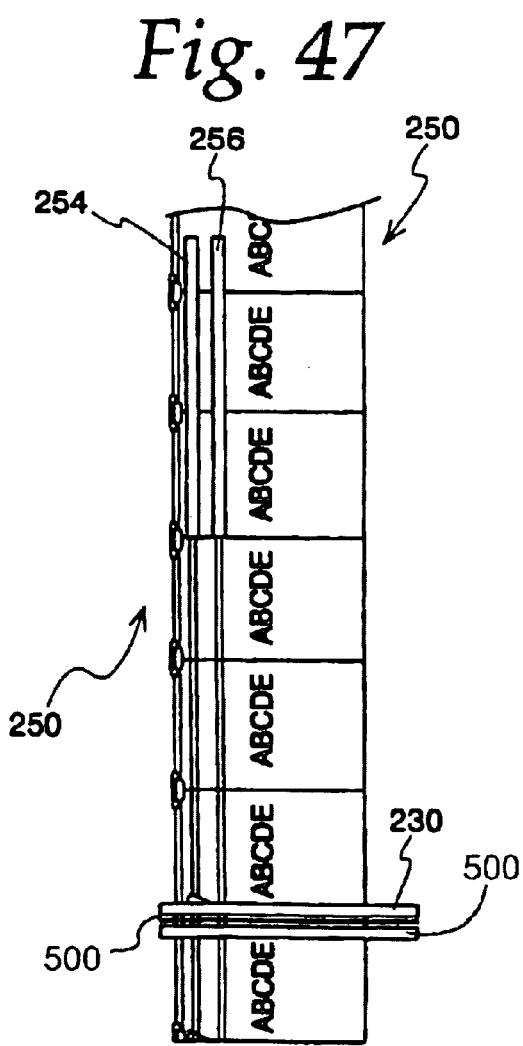
Fig. 46
Fig. 47

APPARATUS FOR MANUFACTURING FLEXIBLE PACKAGES HAVING SLIDE CLOSURES

This application is a division of Ser. No. 09/836,984, Apr. 18, 2001, now U.S. Pat. No. 6,675,558.

BACKGROUND OF THE INVENTION

1. Field of the Invention

The present invention pertains to the manufacture of flexible packages, such as plastic bags, and in particular to packages having fastener closures employing sliders.

2. Description of the Related Art

With the recent emphasis in providing consumers with bulk quantities of various commodities, such as food products, reclosable packages have become increasingly popular. One of the most popular means of providing reclosability is to employ zippers of various types, particularly zippers which are compatible with flexible packages of plastic film construction. Manufacturers of food products and other commodities are concerned with filling the contents of a flexible package as quickly and economically as possible. It is important that the opening provided by the fastener be made as large as practically possible. Consumers or other end users also prefer large sized openings for easy extraction of products from the package interior. Even with large openings, however, products within the package may interfere with fastener operation when product poured or otherwise dispensed from the package becomes entrained in the fastener components.

Other improvements to flexible reclosable packages are being sought. For example, when handling products comprised of numerous small pieces, such as shredded cheese or cereal, for example, it is generally desirable to have the package formed into a pouch which is open at one end, or along one side, so as to allow product to be poured or shaken through the reclosable opening. It is desirable that the product be allowed to freely flow past the reclosable opening. Preferably, the path taken by the product within the package should be made as smooth as possible.

Although improvements have been made in the art of plastic welding and joining, manufacturers of consumer products employing high speed production techniques are continually seeking improved package forming methods and equipment.

SUMMARY OF THE INVENTION

It is an object of the invention to provide apparatus for manufacturing improved flexible packages.

Another object of the invention is to provide apparatus for making reclosable packages having fastener sliders which are protected as the package contents are poured out or otherwise extracted.

A further object of the invention is to provide apparatus for making a reclosable plastic package having a slider fastener with improved containment of the slider in a manner which also optimizes the size of the bag opening.

A further object of the invention is to provide apparatus for making a plastic bag having a slider fastener with an improved end—"crush" stop of the fastener tracks.

These and other objects of the invention are attained in a vertical form-fill seal machine for the in-line manufacturing of food packages having zipper slider closures. The machine includes a supply of web material extending in a machine direction, including a chain or serial succession of food package portions extending in the machine direction. A supply of fastener track with male and female zipper parts is provided. The collar member receiving web material. The web drive transports web material over collar in the machine direction, folding the web into overlying side-by-side portions, one against the other to form a pair of overlying package walls. The supply of slider members are mateable with the fastener track for movement along the fastener track in opposite directions to open and close the fastener track. The slider installation member engages slider members with the fastener track. A pair of zipper seal bars seals to the package wall a portion of the fastener track extends in the machine direction. A pair of peel seal bars extends in the machine direction for forming a peel seal coupled between the package walls. A pair of spaced-apart side seal bars extends at an angle to set machine direction and seal portions of the package walls together to form respective side seals of the food package. The side seal bars and peel seal bar cooperate with the second seal bar to form a closed package.

It has been determined that, in a practical commercial environment, it is difficult to employ conduction heat sealing techniques to form the slider stop. It is preferred that the stop be formed using ultrasonic sealing techniques, as these afford greater control over dimension and shape. This is important when the frontal surface area of the stop (and optionally, the overall mass) is reduced to the greatest extent possible.

BRIEF DESCRIPTION OF THE DRAWINGS

FIG. 1 is a fragmentary front elevational view of an improved flexible package;

FIG. 2 is a fragmentary cross-sectional view taken along the line 2—2 of FIG. 1;

FIG. 3 is a fragmentary end view indicated by line 3—3 of FIG. 1;

FIG. 4 is fragmentary front elevational view showing construction of the flexible package;

FIG. 5 is a top plan view of the slider member;

FIG. 6 is a front elevational view thereof;

FIG. 7 is an elevational view from one end thereof;

FIG. 8 is an elevational view from the other end thereof;

FIG. 9 is an end view of a fastener track sub-assembly;

FIG. 10 is a cross-sectional view, in schematic form, taken along the line 10—10 of FIG. 1 with the slider moved to the left;

FIG. 10a is a fragmentary view, of FIG. 10 shown on an enlarged scale;

FIGS. 10b and 10c show alternative seal constructions;

FIG. 25 is a fragmentary perspective view of a partially formed bag being prepared to receive a slide fastener;

FIG. 26 is a fragmentary cross-sectional view taken along the line 26—26 of FIG. 25;

FIG. 27 is a fragmentary cross-sectional view taken along the line 27—27 of FIG. 28;

FIG. 28 shows a slider being fitted to a partially formed bag;

FIG. 31 is a front elevational view of the sealing horn of FIG. 30a;

FIG. 32 is a cross-sectional view taken along the line 32—32 of FIG. 31;

FIG. 33 is a fragmentary perspective view of a prior art sealing horn;

FIG. 34 is a fragmentary cross-sectional view taken along the line 34—34 of FIG. 30a;

FIG. 35a is a fragmentary cross-sectional view similar to that of FIG. 34 but showing the sealing horn in a sealing operation;

FIG. 35b is a fragmentary elevational view of an upper corner of a flexible package according to principles of the present invention;

FIG. 35c is a cross-sectional view taken along the line 35c—35c of FIG. 35b;

FIG. 35d is a cross-sectional view taken along the line 35d—35d of FIG. 35b;

FIG. 35e is a cross-sectional view taken along the line 35e—35e of FIG. 35b;

FIG. 35f is a cross-sectional view similar to that of FIG. 35a but showing the ultrasonic horn being retracted at the end of a sealing operation;

FIG. 46 is a fragmentary prospective view of the sealing station; and

FIG. 47 is a side elevational view of the sealing station a FIG. 46.

DETAILED DESCRIPTION OF THE PREFERRED EMBODIMENTS

Figure 12:
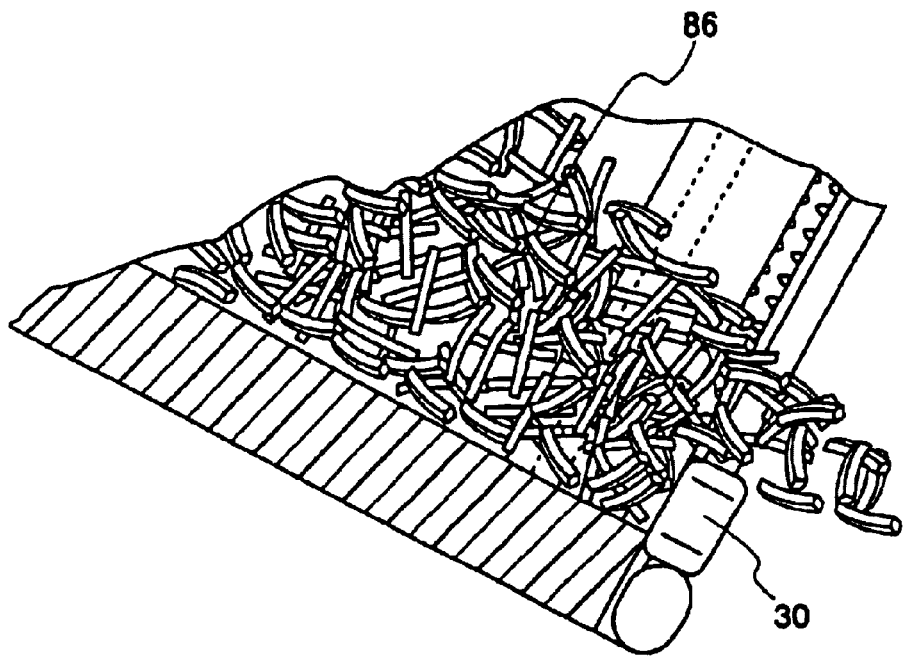
FIG. 12 is a fragmentary front elevational view showing contents of a prior art package.

Referring now to the drawings and initially to FIGS. 1–8, an improved flexible package is generally indicated at 10. The terms "package" and "bag" are used interchangeably and are not intended to refer to any relative size of the finished item. Flexible package 10 preferably comprises a plastic bag having front and back panels 12, 14 joined together at the left end by a side seal 20 and at the right end by a side seal 22. Side seal 20 is preferably of conventional conduction heat-sealed construction, having a generally constant width throughout. Panels 12, 14 are further joined together at their bottom ends by a dead fold, extending between side seals 20, 22, as is known in the art. Alternatively, the bottom seal can be replaced by a fold line with panels 12, 14 being formed from a continuous sheet of plastic material.

The upper end of flexible package 10 features a reclosable opening including a slide fastener arrangement with fastener tracks 26, 28 and a slider 30, all preferably of polyolefin material. The slider 30 is slidable along the fastener tracks, causing the fastener tracks to interlock or mate (as shown in FIG. 2) for closure of the flexible package and to unmate or separate to open the flexible package for access to contents in the package interior. As will be seen herein, features associated with the fastener slider arrangement allow an unprecedented enlarged opening of the flexible package. The enlarged package opening made possible by the improved flexible package benefits manufacturers filling the package, as well as consumers dispensing product from the interior of the flexible package. In the preferred embodiment shown, the fastener tracks are also referred to as "zipper" tracks.

The improved flexible package according to principles of the flexible package has found immediate commercial acceptance for use with food products, including perishable food products, such as shredded cheese. Accordingly, it is generally preferred that the flexible package includes an hermetic seal 36 in the form of a peelable seal as taught in commonly assigned U.S. Pat. Nos. 5,014,856; 5,107,658; and 5,050,736, the disclosures of which are incorporated by reference as if fully set forth herein.

As mentioned above, flexible package 10 preferably comprises a bag having panels 12, 14 formed from plastic sheet material. The sheet material can be of a single material type, such as polyolefin materials including polyethylene and polypropylene, but preferably comprises a laminate assembly of several different material types, as is known in the art to provide a barrier to moisture as well as certain gases, such as oxygen or inert fillers of the types used with food products. Other types of laminate films, such as those known in the art to preserve food freshness, may be employed. Where the contents of the flexible package are not perishable or where other considerations may dictate, the panels 12, 14 can be constructed without regard to gas or vapor barrier properties. FIGS. 2 and 3 indicate that it is generally preferred that the fastener tracks be joined to web-like flanges which, in turn, are joined to panels 12, 14 as will be described below with reference to FIG. 10.

Referring now to FIGS. 5–8, fastener slider 30 has a top wall 44, a shorter side wall 46 and a longer side wall 48, cooperating to define an internal cavity 50*b* for receiving the fastener tracks 26, 28. As can be seen by comparing the end views of FIGS. 7 and 8, a first end 54 of the slider defines a cavity which is generally rectangular. The opposed end 56 (shown in FIG. 8) defines a cavity which is generally arrowhead or A-shaped, as indicated by reference numeral 50*b*, conforming to the outline of the interlocked fastener tracks shown in FIG. 2. When the slider 30 of FIG. 1 is moved to the right, end 56 is at the leading end of the slider and the fastener tracks 26, 28 are unlocked, thus opening the flexible package 10. Conversely, as slider 30 of FIG. 1 is moved to the left, end 54 (shown in FIG. 7) is made the leading end, and fastener tracks 26, 28 are interlocked in the manner indicated in FIG. 2, to close the flexible package.

Referring again to FIGS. 2, 7 and 8, a number of features cooperate to maintain slider 30 captive on fastener tracks 26, 28. As can be seen for example in FIG. 8, a pair of upwardly facing stepped portions 62 are formed on either side of the slider cavity. Inwardly extending protrusions 64 are located at the other end of the slider. Protrusions 64 and stepped portions 62 engage the bottoms 26*a* and 28*a* (see FIG. 2) of fastener tracks 26, 28, as can be seen for example in FIG. 10. The engagement of the stepped portions 62 and the protrusions 64 with the bottoms of the fastener tracks prevents the slider from being upwardly dislocated from the fastener tracks.

Figure 13:
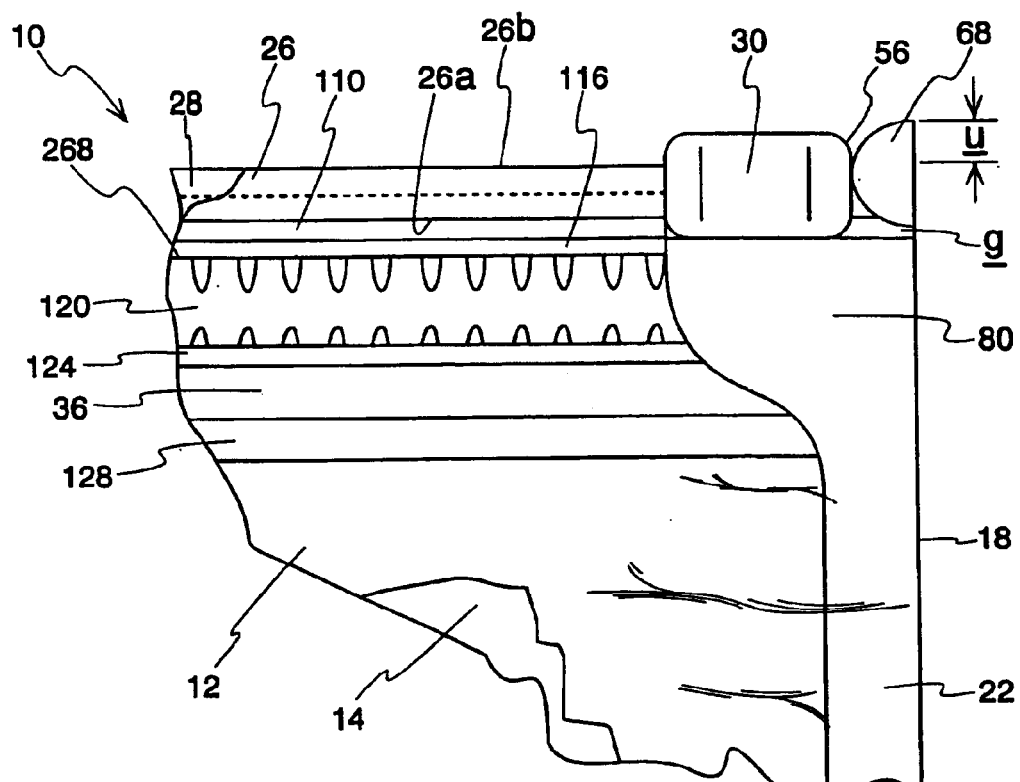
FIG. 13 is a fragmentary front elevational view of an improved flexible package.

Referring to FIGS. 1, 3 and 13, the ends of the of the fastener tracks are deformed or "crushed" to form stops 68. Preferably, stops 68 are formed by the application of ultrasonically generated heat and pressure to the ends of fastener tracks 26, 28. It has been found that the use of present day conduction heat sealing techniques does not provide the control needed to attain the intricate, close tolerance design of stop members according to principles of the improved flexible package. Further, it has been found that the use of present day conduction heat sealing techniques immediately adjacent previously formed stop members tends to distort the stop members, oftentimes to an extent rendering the stop members unacceptable from a quality control standpoint. As will be seen herein, stops 68 are configured for maximum efficiency, having the smallest front elevational surface area (i.e., the surface area visible in FIGS. 1 and 13, for example) which is adequate for containing slider 30 on the fastener tracks.

Referring to FIG. 3, the sides of the fastener tracks are softened and compressed at stop faces or sides 72 so as to impart a pre-selected width w and an upwelling displacement u above the upper surfaces 26*b*, 28*b* of fastener tracks 26, 28 (see FIG. 2). The material displaced above the upper surface of the fastener tracks interferes with the top wall 44 and ends of slider 30 to limit its sideways travel.

With reference to FIG. 3, the slider stop 68 (that is, the deformed portion of fastener tracks 26, 28) is carefully configured so as to avoid deformation of the bottom surfaces 26*a*, 28*a* of the fastener tracks. With reference to FIG. 1, the lower ends of the fastener tracks extend undeformed, substantially to the side edges 16, 18 of the flexible package 10. FIG. 1 shows slider 30 "parked" at a fully opened position, with end 56 contacting the stop 68 located at the right hand end 22 of the flexible package. Stop members 68 and the undisturbed bottom surfaces 26*a*, 28*a* of the fastener tracks in the area of stop members 68 cooperate to captivate slider 30 on the fastener tracks, preventing its unintentional removal from flexible package 10.

It is preferred that the bottom edges 26*a*, 28*a* remain undeformed also for that portion extending beyond slider 30, and underneath at least a portion of the right hand stop 68. With reference to FIGS. 3 and 4, a gap g is formed between the bottom edges of the fastener tracks and the top portion 80 of side seal 22. As can be clearly seen in FIG. 3, the stop 68, formed by ultrasonic techniques, is separated by a substantial distance from the side seal, which is typically formed using conduction heat seal techniques found to be incompatible with the precise, high resolution ultrasonic techniques used to form stop 68. A second stop 68 formed at the left hand end 16 of flexible package 10 is constructed in a similar fashion and extends beyond the end 54 of slider 30 when the slider is moved fully to the left, closing the upper end of the flexible package. As will be explained in greater detail herein, separation of the "crush" operation performed on the fastener tracks to form stops 68 from the conduction heat sealing operation to form the enlarged side seals, allows stops 68 to take on a reduced size, effectively extending the size of the package opening, without sacrificing ability of the stops to effectively retain slider 30 on the fastener tracks.

Referring to FIGS. 1 and 4, side seal 22 includes an upper enlarged or tapered portion 80 having a width substantially greater than the lower end of side seal 22, sufficient to underlie the substantial entirety of slider 30 when the slider is fully moved to the "parked" position as shown in FIG. 1. The width of the enlarged, tapered portion 80 ranges between 200% and 400% (or more for very narrow side seals, e.g., 2 mm or less) of the width s of side seal 22 and most preferably ranges between 250% and 300% of the side seal width s.

Figure 11:
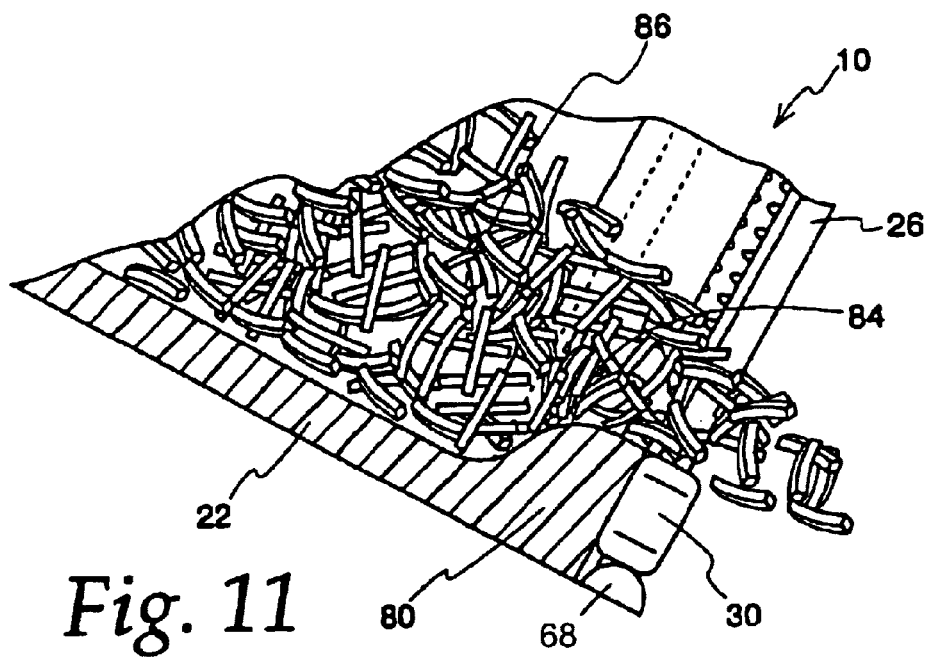
FIG. 11 is a fragmentary front elevational view showing contents being poured from the flexible package.

The enlarged, tapered end 80 of side seal 22 has an S-shaped or double re-entrant bend contour 84 which partly defines the package interior. With reference to FIG. 11, the curved edge 84 of the enlarged side seal portion 80 provides a smooth transition at the corner of the package opening, preventing product entrapment within the flexible package. As those skilled in the art will appreciate, the smooth transition at the opening corner is especially beneficial for flexible packages, where shaking techniques otherwise suitable for rigid packages, are rendered largely ineffective by flexible panels 12, 14 and especially panels of very thin, unsupported material which are likely to collapse in use.

The smooth transition provided by curved edge 84 also deflects or guides product 86 away from slider 30 as product is poured or otherwise removed from flexible package 10. This prevents contamination of mating surfaces of the slider and the fastener tracks, which would otherwise deteriorate the ability of slider 30 to move freely, performing interlocking and unlocking of the fastener tracks. As indicated in FIG. 12, in prior art arrangements product 86 is allowed to freely contact the bottom end of slider 30, a condition which is avoided by flexible packages according to principles of the improved flexible package.

Preferably, fastener tracks 26, 28 are "crushed" to form stop member 68, using ultrasonic heating equipment which allows for a highly accurate shaping of the stop member as well as withdrawal of the deformation area away from the bottom surfaces 26*a*, 28*a* as shown, for example, in FIG. 3. As can be seen for example in FIG. 1, the width of stop member 68 is considerably less than the enlarged tapered portion 80 of side seal 22, and preferably is of a smaller width than that of the narrower major portion of side seal 22. With reference to FIG. 1, the width d of stop member 68 is less than the width s of side seal 22. Preferably, stop member width d ranges between 50% and 200% of the width s of side seal 22. Preferably, the width w of the stop member 68 (i.e., the "crush" dimension) ranges between 25% and 80% of the width z of the fastener tracks, as illustrated in FIG. 3. The amount of upward displacement or upwelling u is approximately at least as great as the thickness of upper wall 44. It should be kept in mind that the total mass of the stop must be sufficient to hold the slider captive.

The stop member 68, in addition to having a reduced width d in front elevational view and a small width w in end view (see FIG. 3), has a sufficiently smaller mass and frontal surface area than stops employed in the prior art. This construction allows the slider 30 to be moved to an extreme position immediately adjacent the edge 22 of flexible package 10, thus maximizing the package opening, allowing for easier removal of the package contents. This reduced size of stop 68 also contributes to the precision of the ultrasonic heating and formation of the stop member, needed to attain required precise dimensions. Further, from a manufacturing standpoint, the dwell time to melt and shape the stop 68 is substantially reduced, contributing to the overall efficiency for the package manufacturer.

In contrast to the improved flexible package, prior art stop members have been formed by "crushing" the entire fastener profile, including the bottom surfaces 26a, 28a. In addition, even if ultrasonic techniques are employed for the stop member, prior art side seals (formed using conduction heat seal techniques and much larger, oftentimes three to four times larger than side seals according to the improved flexible package) were typically overlaid with the stop, contributing to a substantial distortion of the stop structure. Even if the prior art side seals were made to stop short of the fastener tracks, the relatively high level of conduction heating in the immediate proximity of the stop have been found to cause a distortion of the stop, degrading control over its size and shape. These disadvantages are avoided, with the improved bag where the small, compact size of the stop is employed, and the gap g is formed between undeformed fastener bottom surfaces 26a, 28a and the enlarged seal portion 80.

Turning now to FIGS. 4, 9 and 10, and initially to FIG. 9, the fastener tracks are preferably formed from a subassembly generally indicated at 70 in which the fastener tracks 26, 28 are provided with corresponding fastener flanges 72, 74. The fastener flanges 72, 74 are co-extensive with the fastener tracks 26, 28 and take the form of a plastic web to be heat sealed to the panels 12, 14. As can be seen in FIG. 9, fastener flange 74 is shorter in height than fastener flange 72, so as to accommodate the preferred hermetic seal arrangement shown in FIG. 10. The fastener flanges 72, 74 are heat sealed to panels 12, 14. With reference to FIGS. 4 and 10, fastener flange 72 is welded or otherwise mechanically sealed to panel 12 at weld band 78.

As shown at the upper portion of FIG. 10, the upper ends of panels 12, 14 are joined to the outer outwardly facing surfaces of fastener flanges 72, 74 at points intermediate the fastener tracks and peelable seal 36. Band 36 preferably comprises an hermetic peelable seal formed by the joinder of panel 14 to the inside face 72a of fastener flange 72 (see FIGS. 10 and 10a). Panel 12 is sealed to the opposite outside face of the fastener flange as schematically indicated in FIG. 10. In FIG. 10a the components of the peelable seal 36 are shown, with panel 12, which plays no part in the preferred peelable seal, being shown in phantom. Variations of the peelable seal are also contemplated by the improved flexible package. For example, in FIG. 10b, the flanges 72, 74 of the fastener arrangement are joined with a peelable seal. The upper ends of these flanges are heat sealed to panels 12, 14 as shown. In FIG. 10c a further alternative is shown with the peelable seal 36 being formed at the joinder of lower portions of panels 12, 14. the upper portions of panels 12, 14 are heat sealed to fastener flanges 72, 74.

As will now be appreciated, the enlarged, tapered end portions 80 of side seal 22 cooperate with other features of flexible package 10 to provide a number of important advantages. More specifically, the enlarged tapered end portions 80 provide a smooth transition of the interior of flexible package 10 preventing product entrapment in the slider and fastener track surfaces when product is poured or otherwise dispensed. In addition, the enlarged tapered portion 80 helps to secure slider 30 about tracks 26, 28 by maintaining a clearance from bottom surfaces 26a, 28a of the fastener tracks. Further, the enlarged tapered portions 80 of side seals 22 strengthen and rigidify edge portions of panels 12, 14 in the immediate area of the parked position of slide 30.

Often, the greatest amount of force applied by the user to slider 30 occurs at closing, when the fastener tracks are unlocked or separated from one another. When the slider 30 is in the middle of its travel along the fastener tracks, the user is provided with a sensation of the proper direction of slider movement. However, when the slider 30 is in the parked position, and especially in the "parked open" position shown in FIG. 1, the user's initial application of force may be misdirected. The enlarged tapered portion 80 provides added stiffness and rigidity to the flexible package at the initial point where pressure is applied to the slider, thus further contributing to the assurance that secure engagement will be maintained between slider 30 and the tracks 26, 28.

With reference to FIG. 4, a consumer desiring to close the flexible package will grasp the enlarged side seal portion 80, pulling in the direction of arrow 81 while pulling or pushing slider 30 in the direction of arrow 31. The added stiffness and rigidity offered by enlarged side seal portion 80 is provided at a point of optimal effectiveness to react in an appropriate manner to forces applied to slider 30 and to overcome any resistance of the tracks 24, 26 to resume a mating, interlocked condition as the fastener tracks are interlocked. Those skilled in the art will appreciate that the "rolling resistance" or dynamic resistance to movement of slider 30 is oftentimes lower than the initial static resistance, opposing movement of the slider away from the fully opened parked position shown, for example, in FIG. 4.

The added stiffness and rigidity imparted to the flexible package 10 and especially panels 12, 14 by enlarged side seal portion 80 results in other advantages when lightweight panels 12, 14 are employed. For example, panels of the single polyolefin type where no laminate film (such as PET or NYLON) is used to stiffen and support the support panel, have oftentimes excluded the use of sliding zippers, since minimum stiffness and rigidity needed to operate a fastener slider was not available. However, with enlarged side seal portions according to principles of the improved flexible package, adequate stiffness is provided, even for lightweight, so-called "single layer" films.

As indicated in FIG. 10, flanges 72, 74 are joined to respective panels 12, 14, preferably at their lower ends, so as to prevent product from entering between flange 72 and panel 12, as well as between flange 74 and panel 14. In certain applications this may not be a critical requirement. In FIG. 10, the upper portion of panel 12 is shown for illustrative purposes as spaced from the lower end of flange 72. In practice, it is generally preferred that this spacing be eliminated, with panel 12 being in intimate contact with flange 72. Similarly, any gap between panel 14 and the lower end of fastener flange 74 is preferably eliminated. Although it is most preferred that the peelable seal be formed by joining panel 14 to fastener flange 72, the peelable seal, preferably a hermetic seal, can be formed between the fastener flanges 72, 74 or directly between the panels 12, 14, although these alternative constructions are less preferred than the arrangement shown in FIG. 10.

Turning now to FIG. 13, flexible package 10 is shown constructed with the panels 12, 14, side seal 22, upper enlarged side seal portion 80 and fastener tracks 26, 28, as described above. The fastener tracks 26, 28 are preferably joined to flanges 72, 74 (not visible in FIG. 13). FIG. 13 schematically illustrates commercial fabrication of flexible package 10. As will be appreciated by those skilled in the art, practical commercial assembly requires recognition of tolerances of the equipment and materials used to construct a viable commercial product. For example, tracks 26, 28 are ultimately mechanically coupled at their respective flanges 72, 74 to panels 12, 14 using conduction heat seal tooling. A gap 110 shown in FIG. 13 represents the tolerance range or margin of error for tool alignment used to secure the fastener tracks 26, 28. As mentioned, it is preferred that the upper end of enlarged side seal portion 80 be spaced below the lower ends of the fastener tracks, such as the lower end 26a of fastener track 26 visible in FIG. 13. Further, it is preferred that the gap g continue beyond the end 56 of slider 30.

A gap 116 represents a tolerance range or margin of error for the desired positioning of the upper end of enlarged side seal portion 80, to provide clearance for the bottom edge of slider 30. As illustrated in FIG. 13, the upper end of enlarged side seal portion 80 falls at an outermost limit of its tolerance range. Preferably, the upper end of enlarged side seal portion 80 is within the gap 116, rather than to one end thereof. The gap 116 also accounts for any cant or angular mis-positioning or mis-alignment where the upper end of side seal 80 may be angled slightly from a position parallel to the fastener tracks, as may be encountered in a practical commercial environment.

A band 120 shown in FIG. 13 represents a conduction heat seal of the fastener flange to the panels 12 or 14. This conduction heat seal 120 provides the principal mechanical attachment of the fastener track assembly to the package panels. Band 36 is the peelable seal, preferably a hermetic seal, between panel 14 and fastener flange 72. A gap 124 represents the desired production spacing between production seal 120 and peelable seal 36. The remaining band 128 represents the production tolerance range or margin of error for positioning of peelable seal 36 with respect to the package panels.

In one commercial embodiment, flexible package 10 comprises a plastic bag having a width ranging between 4 and 16 inches and most preferably about 6.5 inches from side edge to side edge and a total overall height of approximately 10.75 inches. The fastener tracks 26, 28 have a height of approximately 4 millimeters, with gaps 110, 116 each having a height of 2 millimeters. As shown in the upper right hand corner of FIG. 13, stop 68 projects a distance u above the top edge of the fastener tracks. In FIG. 13, only the top edge 26b is visible. With reference to FIG. 10, the working area of upper ends of panels 12, 14 are preferably spaced a distance p from the bottom edges of the fastener tracks, ranging between 2 and 3 millimeters. The conduction heat seal 120 and the peelable seal 36 each have a height of 6 millimeters, and gap 124 located between the two, has a height of 2 millimeters. The desired spacing between conduction heat seal 120 and peelable seal 36 has a maximum value of 2 millimeters and a minimum value required to prevent overlap of the conduction heat seal and peelable seal. The side seal 22 has a width ranging between 3 and 8 millimeters and the stop 68 has a width (see reference character d in FIG. 1) ranging between 2.0 and 8.0 mm. As can be seen with reference to FIG. 13, the upper end of side seal 22 is spaced a substantial distance below the upper edge of the flexible package. This spacing ranges between a minimum value equal to the combined height of the fastener tracks and gap 110, and a maximum value equal to the combined height of the fastener tracks, gap 110 and gap 116.

Figure 14:
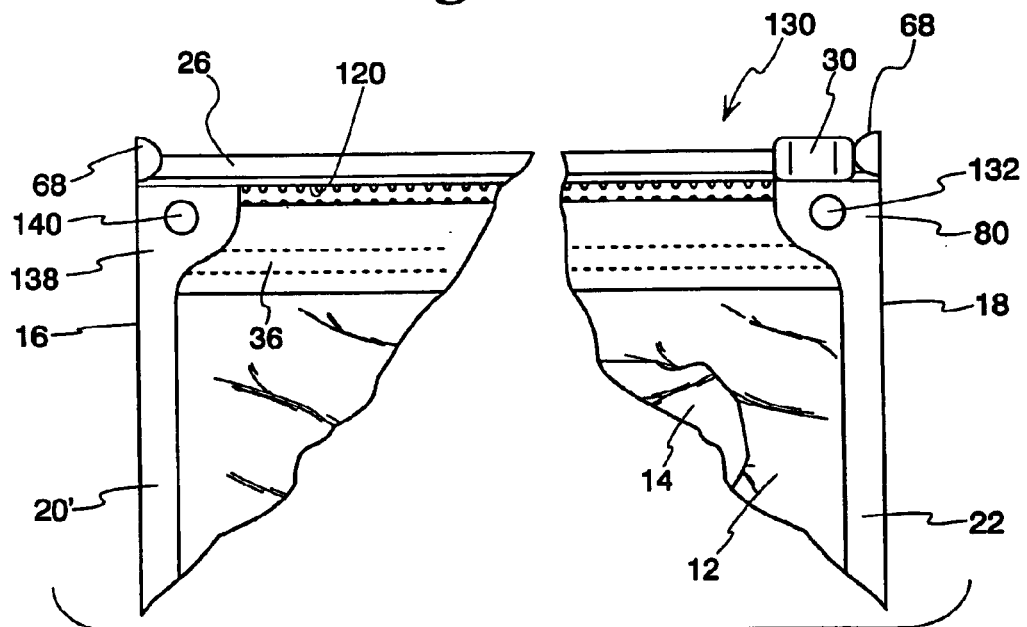
FIG. 14 is a front elevational view of an alternative flexible package.

Referring to FIG. 14, several alternative features are shown with reference to a flexible package 130. The right hand portion of flexible package 130 is identical to flexible package 10, described above, except for the addition of a peg hole 132 formed in the enlarged side seal portion 80. Flexible package 130 has a left side seal 20 as described above with respect to FIG. 1. However, in the flexible package 130, the upper end of side seal 20' is enlarged at 138 in a manner similar to that of enlarged side seal portion 80. An optional peg hole 140 is formed in the enlarged side seal portion 138. Although the peg holes 132, 140 are shown having a circular shape, virtually any shape (e.g., oval) can be used, as well.

Peg holes 132, 140 can be formed by punching before or after the side seals are fully formed, it being preferred that the upper ends of the side seals provide a complete sealing of the panels and other components of the flexible package. It will be appreciated by those skilled in the art that the holes add heat relief to the enlarged side seal portion. This helps preserve the uniformity of the tapered area and of the dimensioning of gap g, as well as the uniformity of shrinkage which helps control manufacture on a production basis. If desired, the heat sealing die can be made hollow in the region of the peg holes, even in the absence of peg hole features to attain further heat relief advantages. It may also be preferable in some instances to form the peg holes 132, 140 as part of the formation of the side seals using, in effect, a thermal cutting or thermal punching technique. With the inclusion of two peg holes 132, 140, flexible package 130 can provide an improved presentation of art work or other indicia carried on the panels of the flexible package.

It is generally preferred that textual and graphic information be oriented generally perpendicular to the side edges of the flexible package. If only one peg hole is provided, the package will tend to hang rotated in a vertical plane, according to the distribution of product within the flexible package. With support given to two peg holes 132, 140, the flexible package is oriented in an upright position, making it easier to read the text and graphical information carried on the package. If desired, the text and graphical information printed on the rear panel can be inverted so that a consumer can "flip" the package to inspect the rear panel, without having to remove the package from the support pegs passing through peg holds 132, 140.

Although the package opening, fastener tracks and related features are shown at the upper end of the flexible package, the improved flexible package is intended to cover arrangements in which the opening and related structure is provided on the side or bottom of the flexible package.

Figure 15:
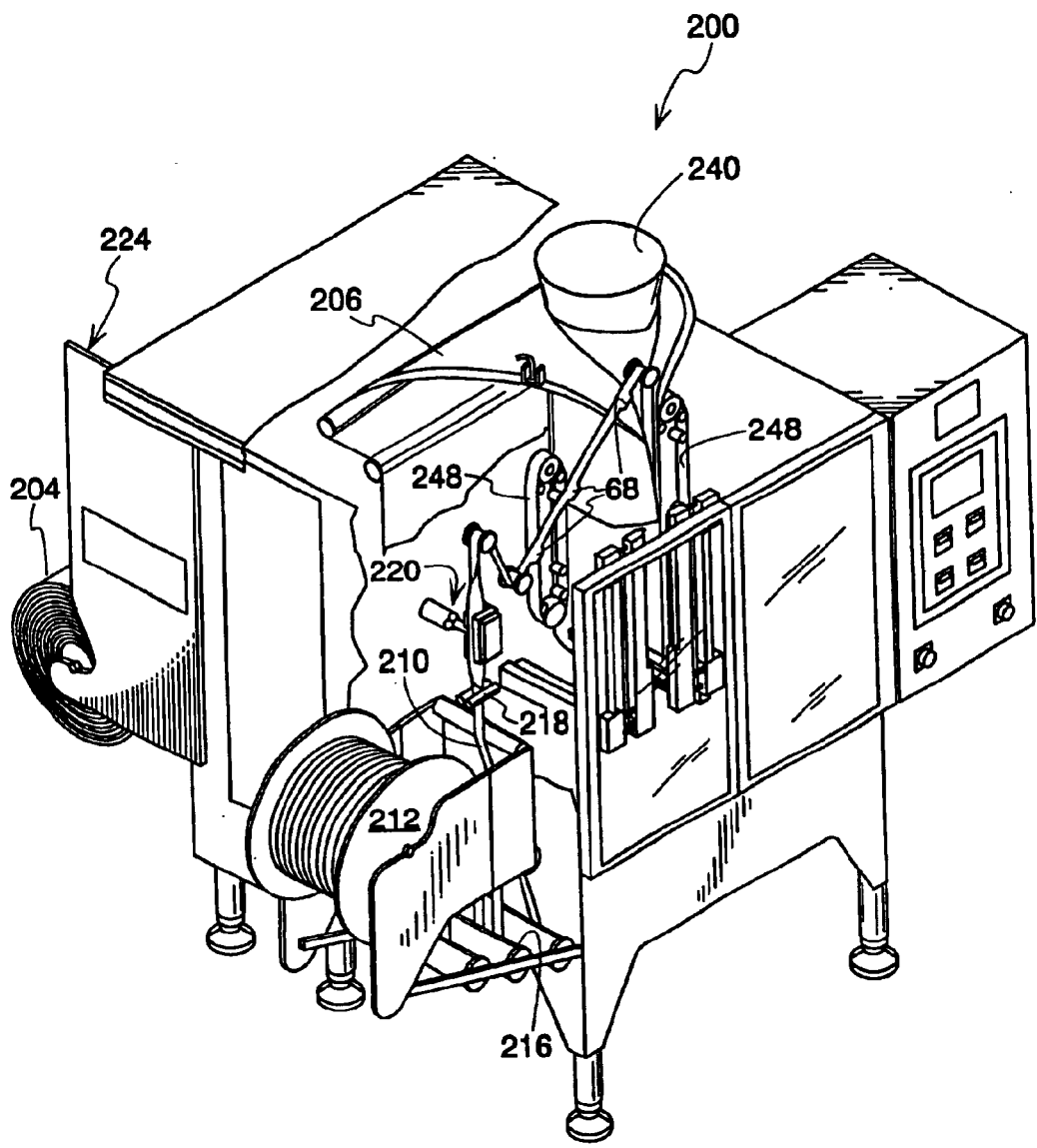
FIG. 15 is a perspective view of manufacturing apparatus according to principles of the present invention.

Turning now to FIG. 15 and following, apparatus for manufacturing improved flexible packages having slide closures will now be described. As will be seen herein, the apparatus according to principles of the present invention, generally indicated at 200 employs a vertical form fill seal arrangement with the in-line application of mated fastener tracks to a folded web. Apparatus 200 brings all of the required packaging components together, for assembly, at the point of fill.

Figure 16:
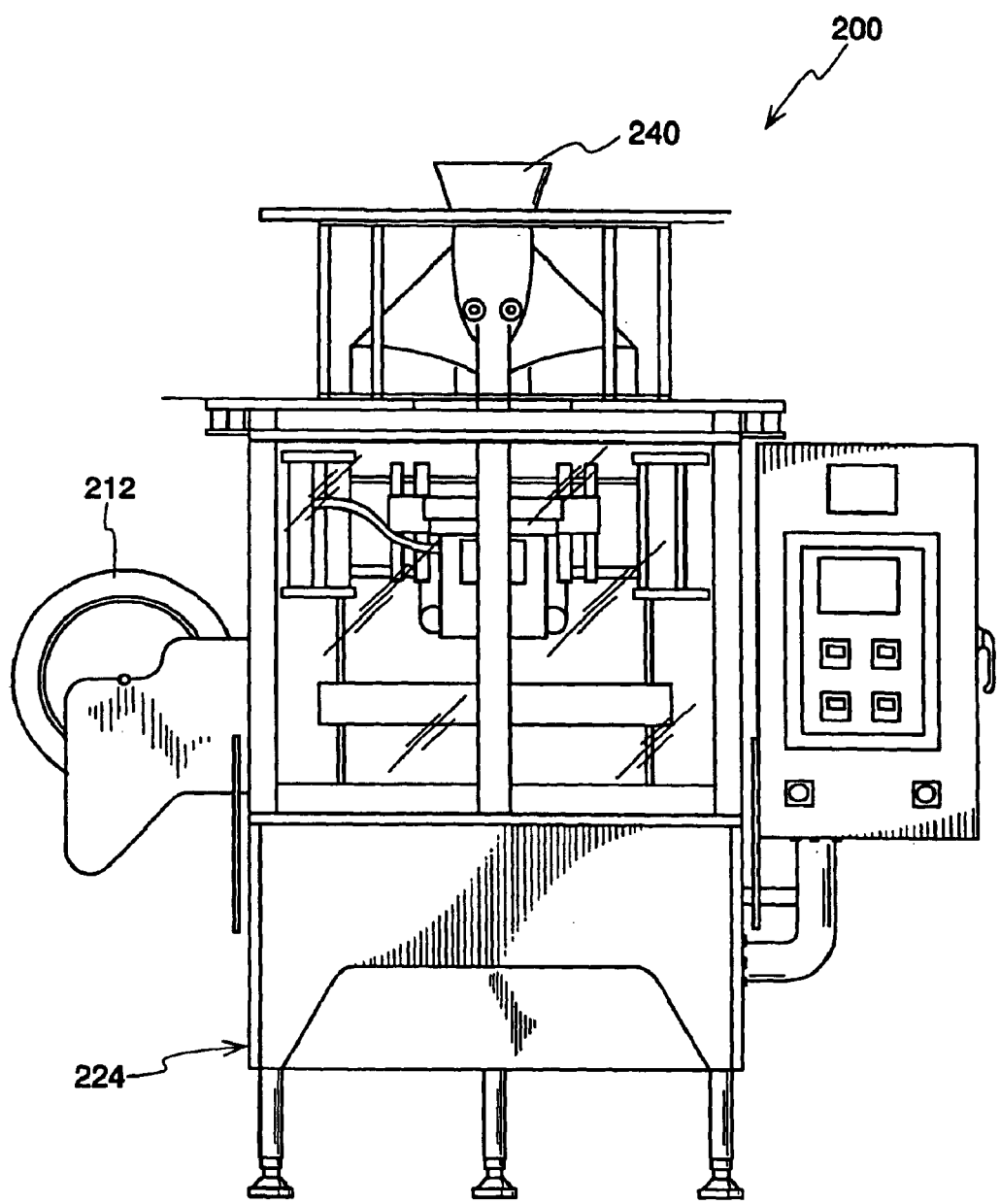
FIG. 16 is a front elevational view thereof.

Referring to FIGS. 15 and 16, apparatus 200 includes a web supply roll 204 providing a supply of web material 206 preferably comprising a conventional plastic packaging film. A supply of mated fastener track 210 (preferably comprising fastener tracks 26, 28) is supplied on roll 212. Further details concerning the construction and operation of the noted fastener tracks 210 and slider 30 of the preferred embodiment may be obtained with reference to U.S. Pat. No. 6,047,450, the disclosure of which is herein incorporated by reference. Preferably, the fastener tracks include respective mounting flanges which overlying one another and which extend along with the mated fastener tracks. As can be seen, the mounting flanges are of unequal height (with the food package viewed in an upright position) and extend from the fastener tracks different amounts. The mated fastener track 210 is fed through a roll-type accumulator 216 and passes through a series of roller guides 218 to enter a work station generally indicated at 220 for forming stops 68 in the mated fastener track. As shown in FIG. 15, a spaced apart series of back-to-back stops 68 are formed at work station 220 and appear downstream of the work station, being fed by drive rollers 226, shown in FIG. 23.

Figure 17:
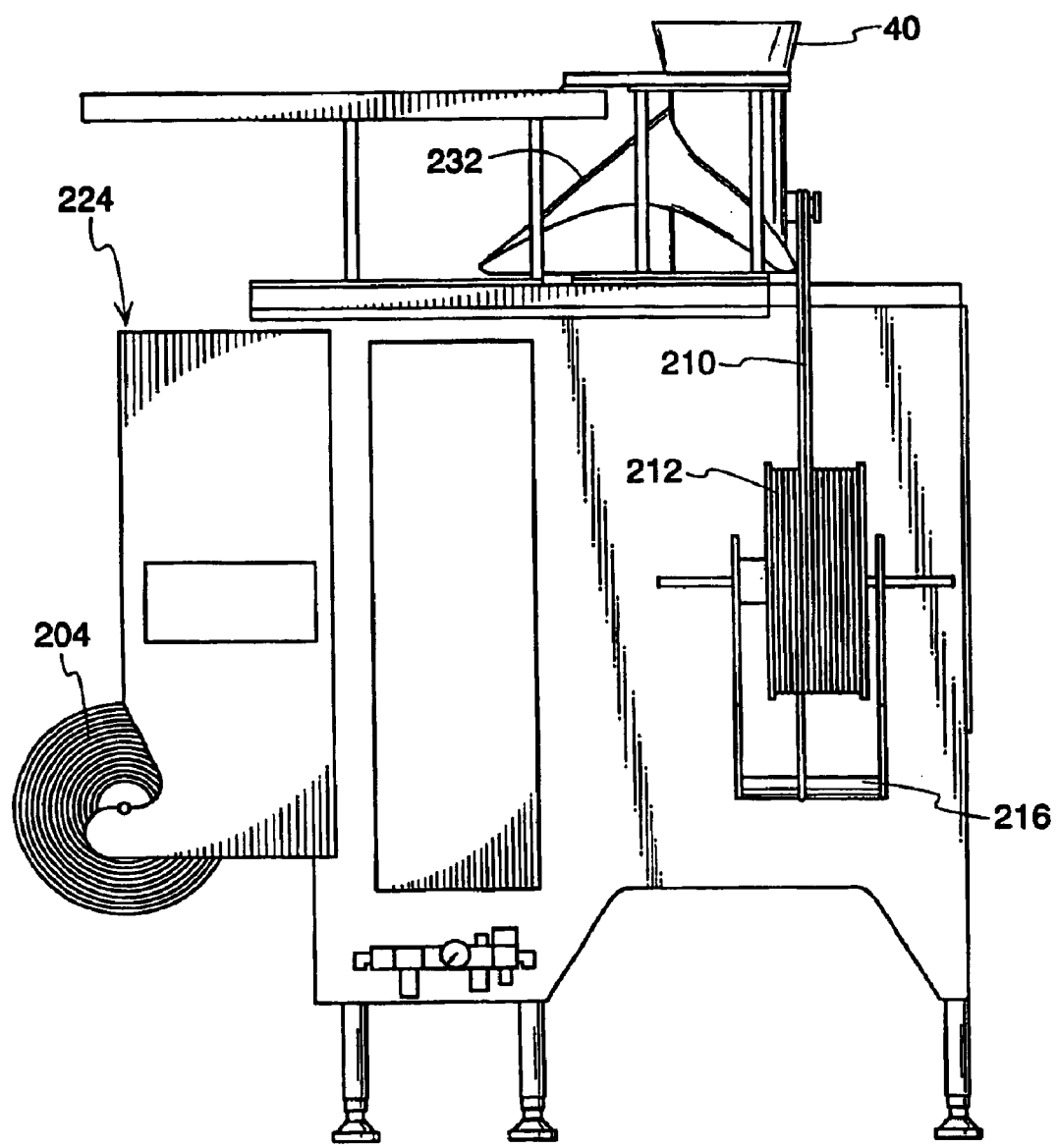
FIG. 17 is an elevational view from the left side thereof.
Figure 18:
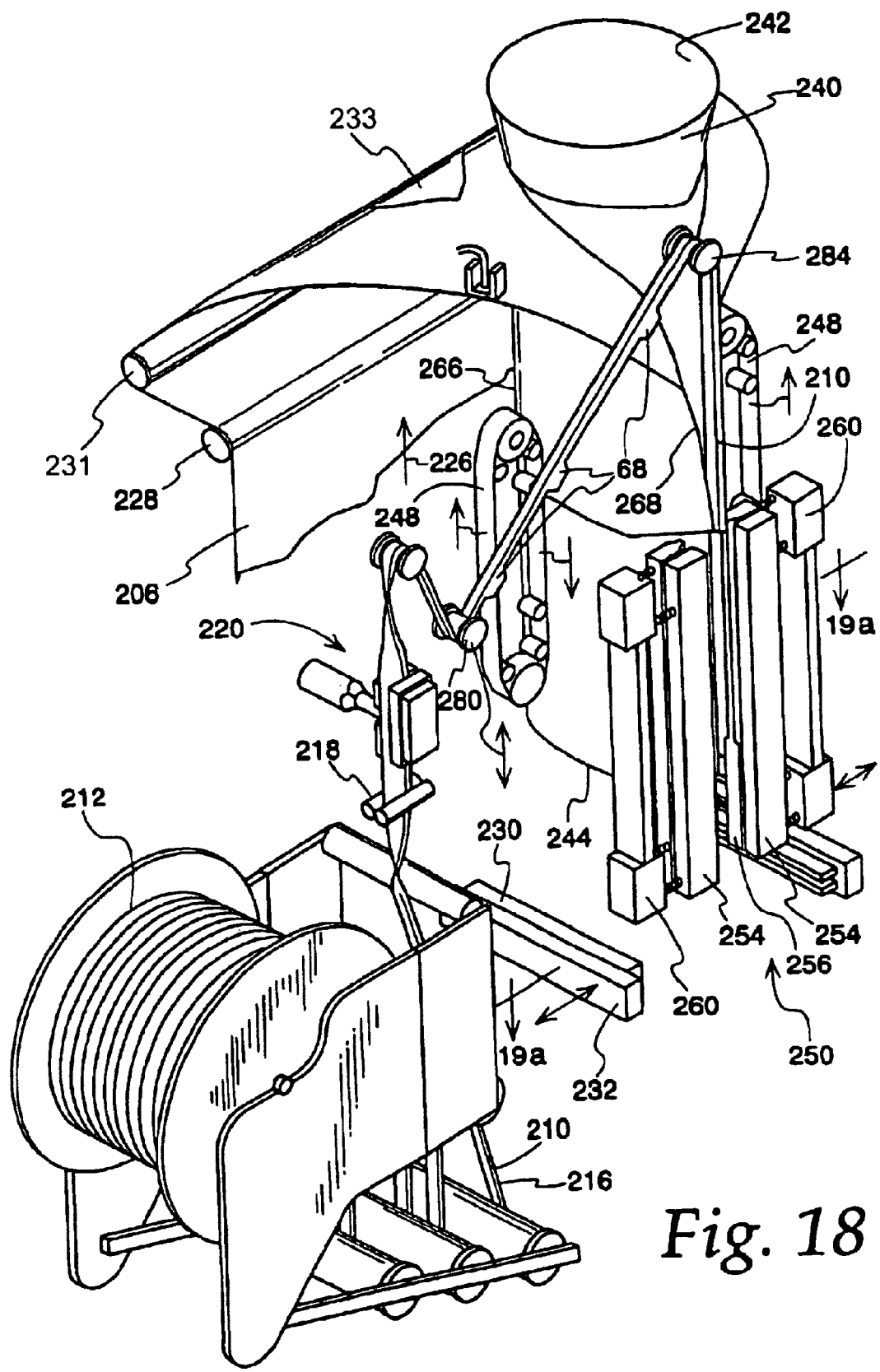
FIG. 18 is fragmentary perspective view thereof.

Referring now to FIG. 17 web supply roll 204 is mounted to the rear of a cabinet assembly 224 and passes through a number of accumulator rollers (not shown) to travel in a generally upward direction indicated by arrow 226 in FIG. 18. The web then travels over guide rollers 228, 231 to enter the rear of a forming collar 232. Forming collar 233 is of conventional construction, and forms web 206 about a hollow mandrel 240 to take on an initial tube-like form adjacent the upper open end 242 of the mandrel. The tube shaped web is gradually flattened as it descends along the outside of the mandrel, to fold the web into overlying side-by-side panel portions which, when divided, become the package panels 12, 14.

When passing below the bottom end 244 of mandrel 240 the overlapping web portions are spaced very close to one another, being held apart by the hollow mandrel bottom. Product is passed through the mandrel to fill the flexible package as it is formed in the manner to be described herein.

Web 206 is driven across collar 233 and mandrel 240 by drive belts shown for example in FIGS. 15 and 18. Preferably, the web and mated fastener tracks are advanced in a stepwise intermittent motion. The web material and mated fastener tracks are stopped long enough to allow seal bar station 250 to perform a number of operations on the web and mated fastener track. Seal bar station 250 includes, on each side of the folded web, a panel seal bar 254 and a peel seal bar 256. Preferably, the vertical seal bars 254, 256 are driven back and forth toward and away from the web by an actuator 260, preferably of the pneumatic type. Mirror image arrangements of vertical seal bars and actuators are provided on either side of the folded web.

With reference to FIG. 18, web 206 has a folded crease 266, preferably a dead fold, which can be employed to form the bottom of the bag (FIG. 10) or which can be heat sealed to form a reinforced fin seal (not shown). Free edges 268 of web 206 pass between the mated pairs of seal bars, as indicated in FIG. 19. As can be seen, the package forming apparatus forms a "bag chain" that is, a continuous web defining a serial succession of food package portions extending in the machine direction and having pairs of overlying package walls which include overlying free edges. The forming collar forms a dead fold in the web which extends in the machine direction, forming an opening between the overlying package walls of each food package portions which is located opposite the dead fold and which is formed by free edges of the overlying web portions.

As shown in FIG. 18, a mated fastener track 210 is payed out in the vertical machine direction and is aligned with the free edges 268 of a folded web. The mated fastener track is welded to the free edges of the folded web panel by fastener track or panel seal bars 254 to form a weld seal 120 shown for example in FIG. 10. The mated fastener track is thereby joined to the web material, for common advancement therewith by drive rollers 226 (see FIG. 23) which operate on the combined sub-assembly. As will be seen herein, a registration adjustment is provided by idler roller 280 shown in FIG. 18, downstream of work station 220. As web material is driven by drive belts 248 (FIG. 18) and as the joined assembly of fastener track and web material is driven by rollers 226 (see FIG. 23), mated fastener track 210 is payed out from work station 220, passing over guide roller 284 (see FIG. 18) located at the upper portion of mandrel 240, as shown in FIG. 18.

Figure 19A:
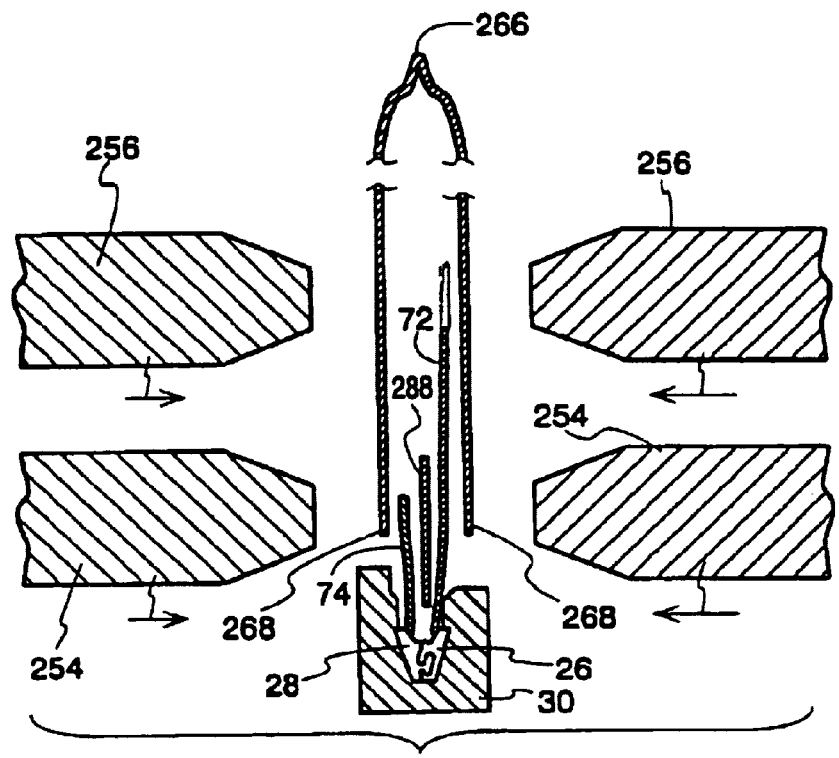
FIG. 19a is a fragmentary cross-sectional view taken along the line 19a—19a of FIG. 18.
Figure 19B:
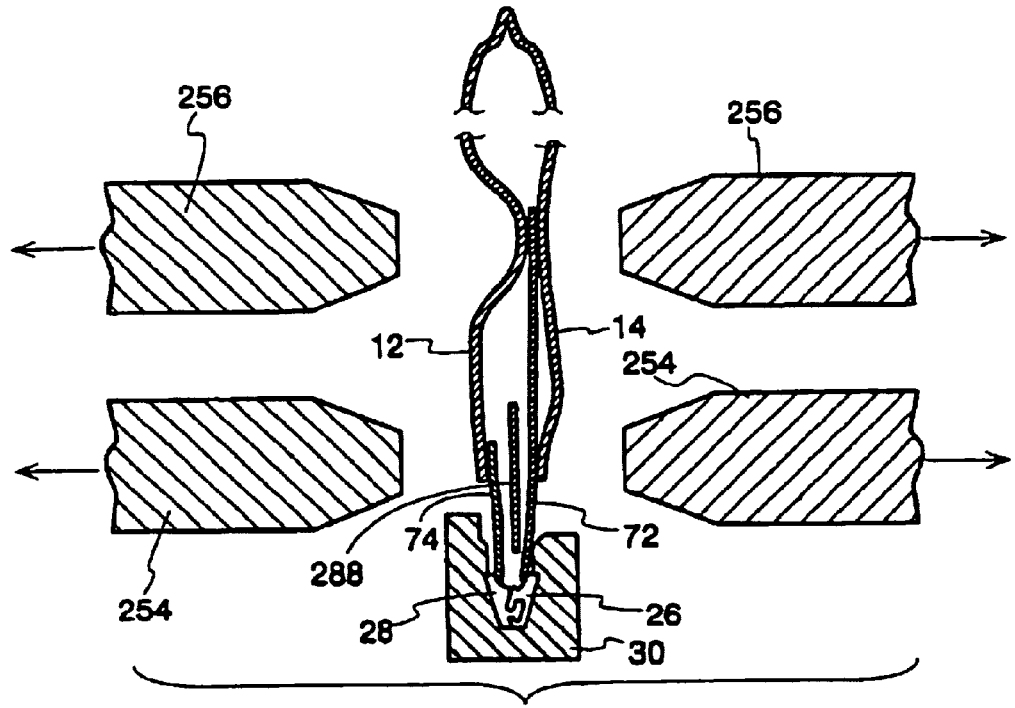
FIG. 19b is a fragmentary cross-sectional view similar to that of FIG. 19a, shown at the end of the sealing operation.
Figure 38:
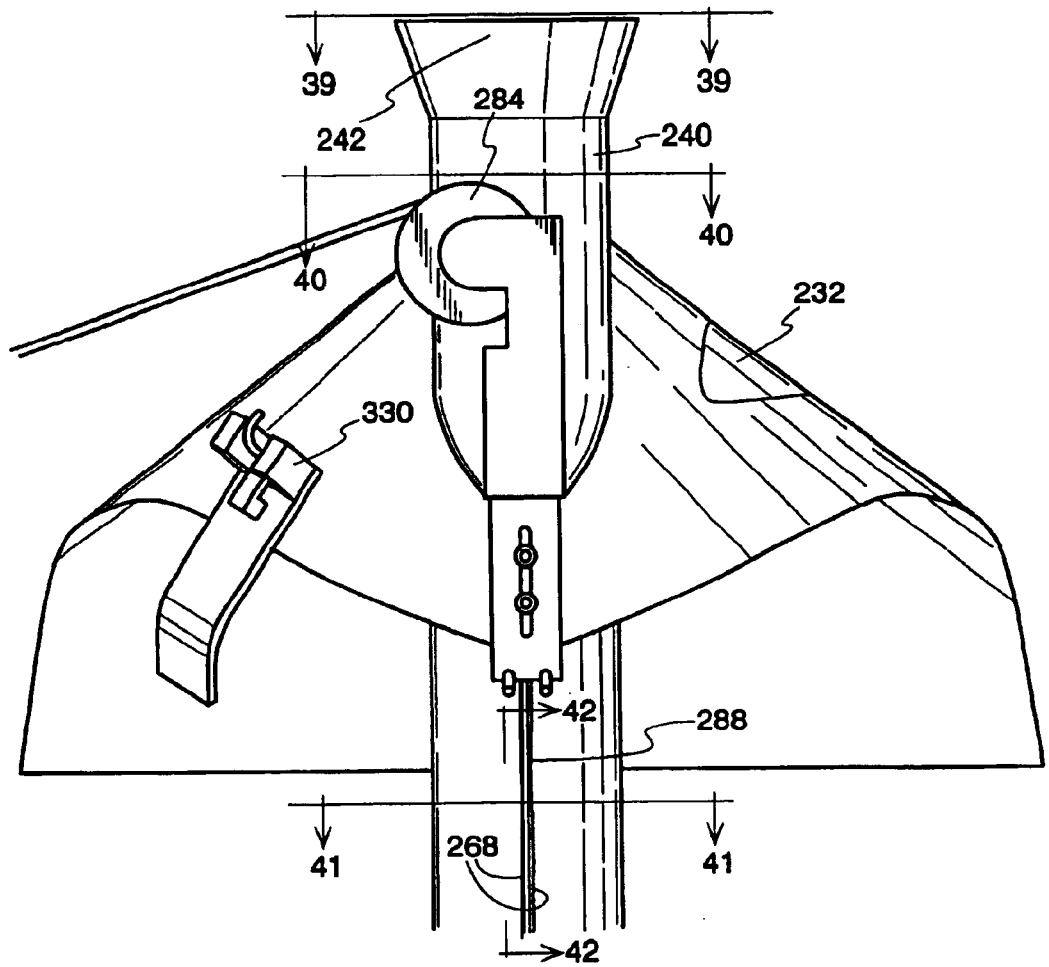
FIG. 38 is an enlarged fragmentary view of the upper portion of FIG. 15, shown in elevation.
Figure 39:
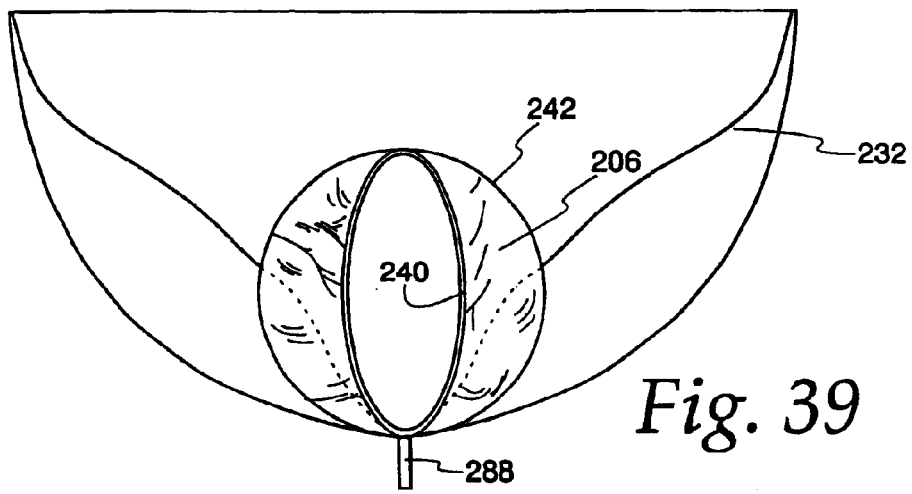
FIG. 39 is a cross-sectional view taken along the line 39—39 of FIG. 38.
Figure 40:
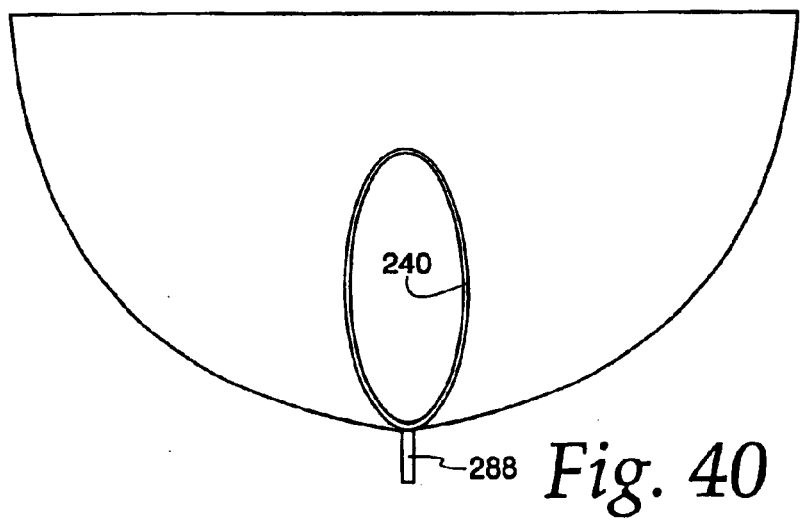
FIG. 40 is a cross-sectional view taken along the line 40—40 of FIG. 38.
Figure 41:
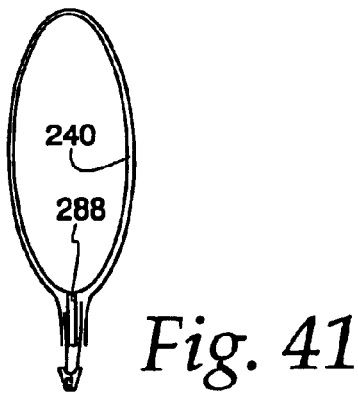
FIG. 41 is a fragmentary cross-sectional view taken along the line 41—41.
Figure 42:
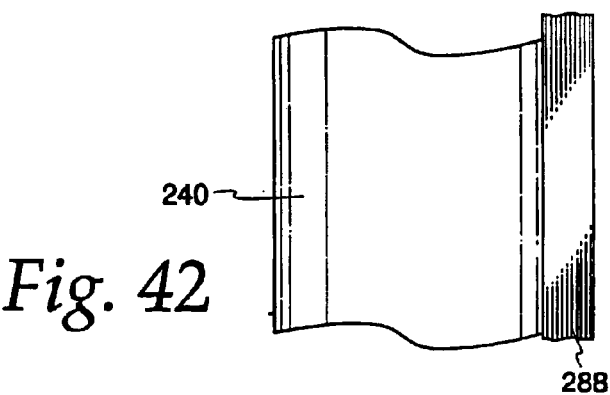
FIG. 42 is a cross-sectional view taken along the line 42—42 of FIG. 38.

As shown in FIGS. 19a, 19b, an isolation bar 288 is interposed between fastener track flanges 72, 74 for an economical weld seal formed by panel seal bars 254. FIG. 19a shows the vertical sealing bars prior to operation of the vertical sealing bars, while FIG. 19b shows the vertical sealing bars after completion of the sealing operation. It has not been found necessary to cool isolation bar 288 although, if desired cooling can be applied in a conventional manner, with bar 288 functioning as a cooling bar. With reference to FIGS. 38 and 42, isolation bar 288 is mounted to the lower portion of mandrel 240 and is located in front of the mandrel in the manner shown in FIGS. 39–41 so as to be interposed between mating seal bars 254. When operation of the vertical seal bars is completed, the joinder of the mated fastener tracks and web panels 12, 14 is completed as shown in FIG. 42 to form the packaging features described in FIG. 10, above.

Figure 37:
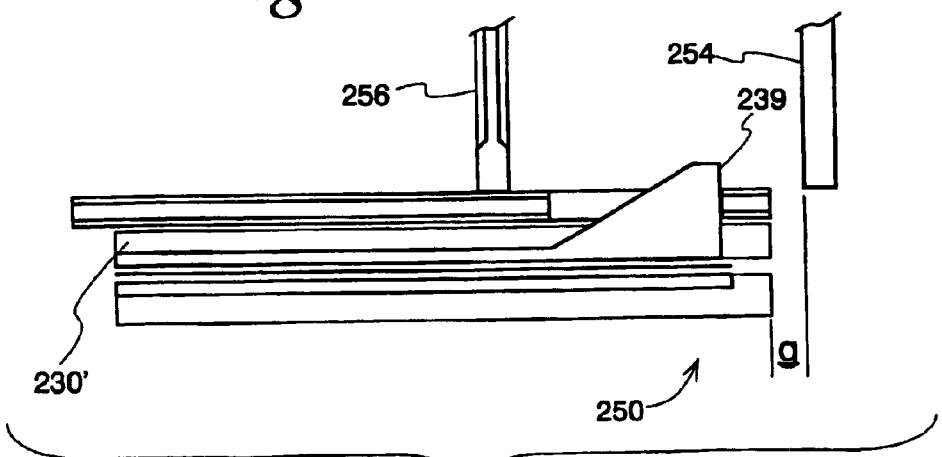
FIG. 37 is a front elevational view of the vertical and horizontal sealing bars shown above.

A pair of mating horizontal seals 230 are provided at station 250, as shown in FIGS. 18 and 37. The horizontal seal bars 230 are reciprocated toward and away from the web panels by horizontal independent actuators 232 which are preferably of the pneumatic type and are preferably spaced below vertical actuators 260. The horizontal seal bars extend in a direction generally transverse with respect to the vertically downward machine direction in which the web and fastener track material travel as they pass through apparatus 200.

Figure 44:
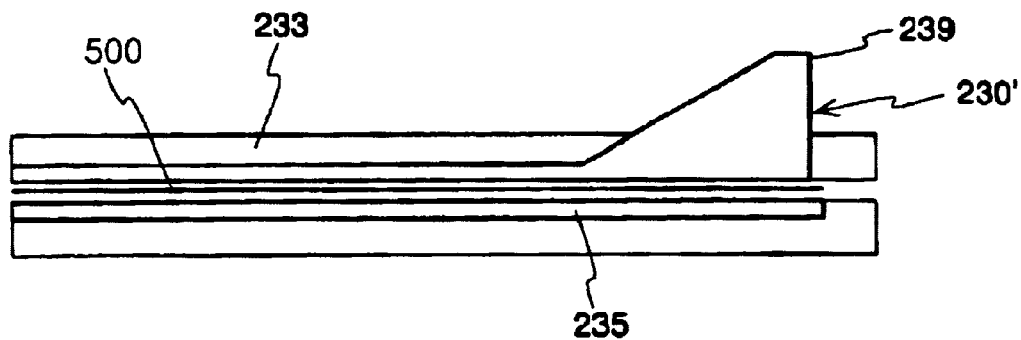
FIGS. 44 and 45 show elevational views of horizontal sealing bars shown above.

The horizontal seal bars form the side seals of the flexible package as described above with reference to FIGS. 1–14. With reference to FIGS. 1 and 44, for example, the horizontal seal bars in one configuration contain an upper portion forming the right hand seal 18, which includes tapered end portion 80. It is also preferred that the same horizontal seal bar includes an immediately adjacent lower portion which forms the left hand seal 16. Thus, with a single stroke of horizontal actuator 232, mating seal bars 230 can operate on a serial chain of bags formed from a continuous web. A right hand seal 18 of a first flexible package (located at the leading end of the traveling web) is simultaneously formed with a left hand seal 16 of an immediately preceding flexible package (i.e. at the trailing end of the package) located immediately there below in the chain of (unsevered) packages. With progressive formation of the bag chain in the forming apparatus, a series of pouches are formed, one of the time, in preparation for a filling operation. The pouches define a hollow interior between the overlying web portions, bounded by the dead fold, the peel seal and the leading side seal (which comprises the right hand side seal of the bag shown in FIG. 1). The remainder of the pouch (corresponding to the left-hand side seal of the bag in FIG. 1) is, for the time being, left open. As can be seen, the pouch opening faces an upward direction, with the opening providing a convenient point of top fill for the product. This arrangement has been found to be particularly advantageous for the packaging of shredded cheese products in a high-speed automated environment.

Located between the horizontal seal bars is a cutting blade 233 (see FIG. 47) where the chain of bags is severed, dividing the trailing side seal 16 of a lower bag from the leading side seal 18 of an upper bag, thereby separating a completely formed flexible package from the monolithic chain of bags being processed by apparatus 200. Severing of the web and mated fastener tracks is preferably carried out under tension. It is generally preferred that the web drive and drive controls associated with the web position sensor cooperate to tension the web material and mated fastener tracks while the horizontal sealing bars carry out a simultaneous cutting and side seal forming operation.

Figure 45:
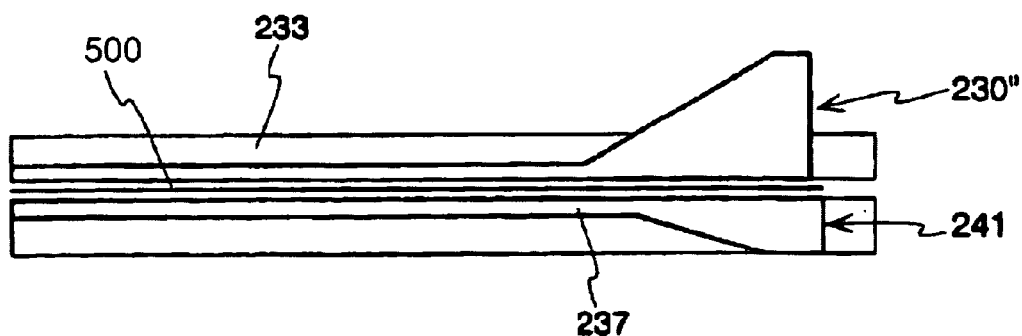

Referring to FIGS. 44 and 45, examples of horizontal seal bars are illustrated. In FIG. 44 a horizontal seal bar 230 is used to form the flexible package shown in FIG. 1. The upper seal bar portion 233 forms seal 22 (shown at the right hand of FIG. 1) while the lower seal bar portion 235 forms the side seal 20 (shown in the left hand portion of FIG. 1). A line 231 divides upper and lower seal bar portions 233, 235 and defines a cut line along which the chain of bags is subsequently severed. A conventional cutting blade is preferably positioned between the sealing bar portions, being positioned for simultaneous sealing and severing operation with a single stroke of horizontal actuator 232. Referring to FIG. 45, seal bar 230" is identical to seal bar 230' except that the lower seal bar portion 237 comprises a substantial mirror image of the upper seal bar portion 233. Horizontal seal bar 230" is used to form the flexible package 130 shown in FIG. 14, with the lower seal bar portion 237 forming side seal 20' (shown at the left hand side of FIG. 14). Other seal bar portions may be used to provide flexible package side seals having configurations different from those of FIGS. 1 and 14.

As pointed out above, it is important that a gap be maintained between the ends of the side seals and the stop portions 68. Accordingly the ends 239, 241 of horizontal seal bars 230', 230" are accurately defined and mounted for a precision fit with regard to the horizontal actuators 232. It is important that the horizontal actuators 232 be precisely mounted with respect to the seal bands formed by vertical seal bars 254, as can be seen with reference to the drawings for the flexible packages and the seal bands formed therein (see FIGS. 1, 13 and 14 for example). The horizontal seal bars extend past the peel seal bars, and at least extend partially over the seal formed by panel seal bar 254. So as to maintain the gap g as discussed above with respect to FIG. 13. Referring now to FIG. 46, the relative positioning of the horizontal and vertical seal bars is shown.

Referring now to FIGS. 20–29, various methods used in the operation of apparatus 200 will be described. As mentioned above, web material is payed out from roll 204 while mated fastener track is payed out from roll 212. End stops 68 are formed in track 210, preferably two at a time in back-to-back mirror image relationship. The fastener track with precisely spaced stop members 68 is then passed over guide 284 to proceed in the downward feed direction of apparatus 200 (see FIG. 18).

Figure 20:
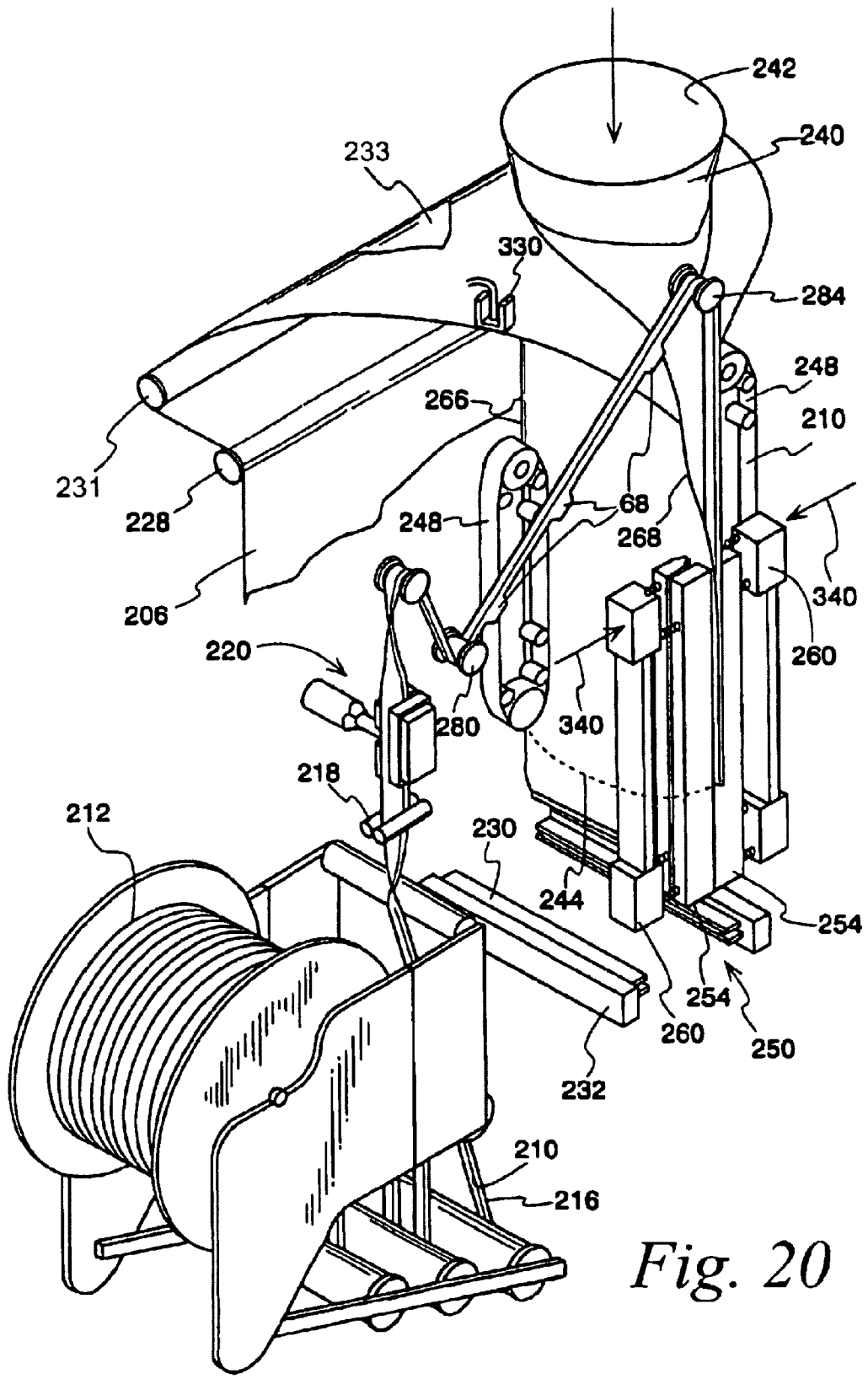
FIGS. 20–24 show the arrangement of FIG. 18 undergoing a sequence of operational steps.
Figure 36:
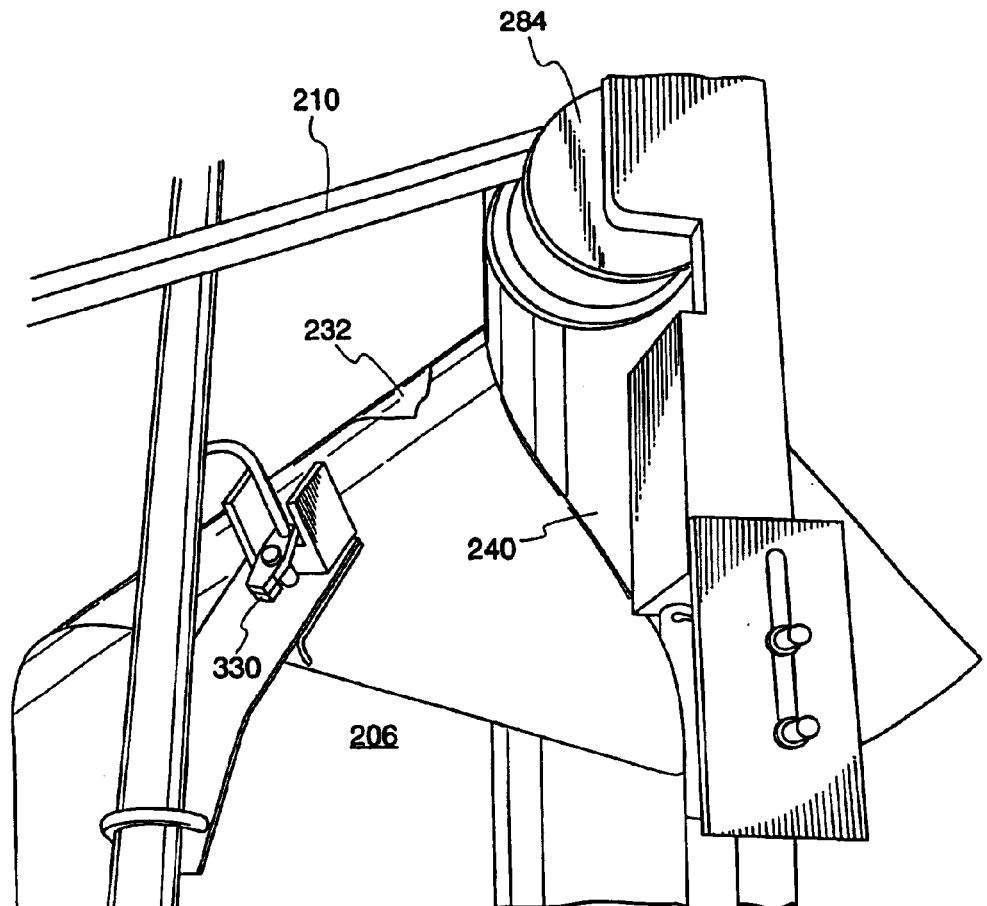
FIG. 36 is an enlarged fragmentary view of the upper portion of FIG. 15.

The web material is formed into a tube and subsequently into a flattened tube by passing over collar 233 as shown for example in FIG. 18. Free edges of the web material are overlaid over the fastener track flanges as described above with reference to FIG. 10, and the overlying combination is fed between mating pairs of vertical seal bars 254, 256. As shown for example in FIG. 24, it is preferred that the vertical seal bars span several package sections of the monolithic chain of bags consisting of the unsevered combination of web and fastener track materials passing through apparatus 200. It is important to identify which portions of the web and fastener track materials are to be combined together and properly aligned in registry with one another to form an individual flexible package, once severed from the chain of bags. Referring for example to FIGS. 20, 36 and 38, a position sensor 330 is located adjacent guide 284 located at the throat of the collar where free edges of the web are brought together in overlapping relationship. The position sensor is located adjacent the forming collar and most preferably is supported by the mounting collar.

It is preferred that the web sensor 330, which controls web advancement past the seal bar station 250 and subsequent severing station, be located as close as possible to the seal bar station, without interfering with the fastener track being fed between the web free edges. According to one aspect of the present invention, web position sensor 330 is located at least within six (6) bag widths away from severing station 250, and most preferably is located within four (4) bag widths of the sealing station. The term "bag width" as used herein may be seen to comprise, for example, the entire width of the bag shown in FIG. 1 or 14, the bag width being diagrammatically illustrated in FIG. 24 by reference lines 334. One object of the present invention is to provide increased registration accuracy of the web and fastener tracks, and it is accordingly unsatisfactory to locate web position sensors adjacent the supply roll 204 or the accumulator rollers (not shown) located immediately adjacent thereto. In the preferred embodiment, web position sensor 330 controls operation of web drive belts 248 and may, if desired, be employed to control or provide one of several control inputs for operation of drive rollers 226 shown in FIG. 23.

Referring to FIG. 20, the fastener track 210 with preformed stops 68 is passed between overlying free edges of web 268 and is passed between seal bars located in seal station 250. The fastener track is precisely aligned with respect to the free edges of the overlying web portions in the manner described above with respect to FIG. 13. The vertical seal bars are then operated to seal the fastener track to the web with actuation in the direction of arrows 340. During machine set up, the bottom edge of the joined web and fastener tracks is fed between rollers 226 which thereafter provide automatic drive for the combined assembly.

Figure 43:
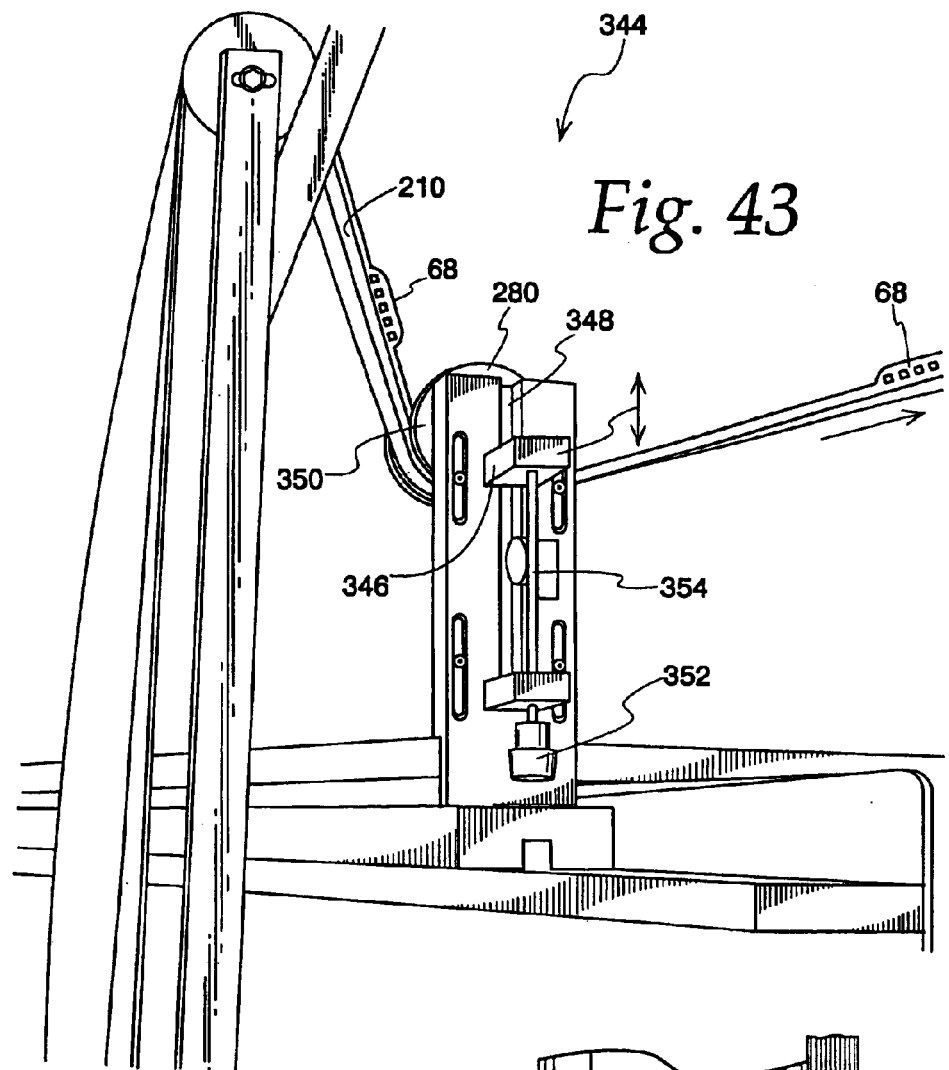
FIG. 43 is an enlarged perspective view of the synchronizing assembly of FIG. 15.

After running a few trial steps, registration of the fastener tracks and web is checked and changes to the registration of the fastener track with respect to the web is carried out by operation of registration roller 280 which is moveable in the direction shown by the arrow in FIG. 18. A preferred embodiment of a registration station 344 is illustrated in FIG. 43. The registration device of the preferred embodiment includes an idler roller engaging the mounting fastener tracks. The idler roller is mounted for movement toward and away from a neutral position so as to alter tension applied to the mated fastener tracks. Idler roller 280 is mounted on block 346 which traverses a guide channel 348 formed in mounting bar 350. The operation of knob 352, threaded rod 354 is rotated, causing block 346 and hence idler roller 280 to travel in the desired direction. By lowering idler roller 280, tension in the fastener track 210 is increased and loosening of tension in the fastener track is achieved by raising the idler roller 280. Such adjustments cause a change in relative positioning of the fastener track at sealing station 250, with respect to those portions of the web material also located at the sealing station. Hence, with simple tension adjustments registration station 344, registration of the fastener track and web material at the sealing station can be readily altered.

Even though spacing of the stop members 68 is otherwise provided it is important in many commercial applications to provide registration adjustment of the type mentioned herein. For example, it is commercially advantageous to provide web material which is pre-printed with individual package portions appearing in serial succession on the web material stored on supply roll 204. With the registration adjustment station provided, relatively small adjustments in registration can be made "on the fly" during a production run, without requiring production shut down.

Figure 21:
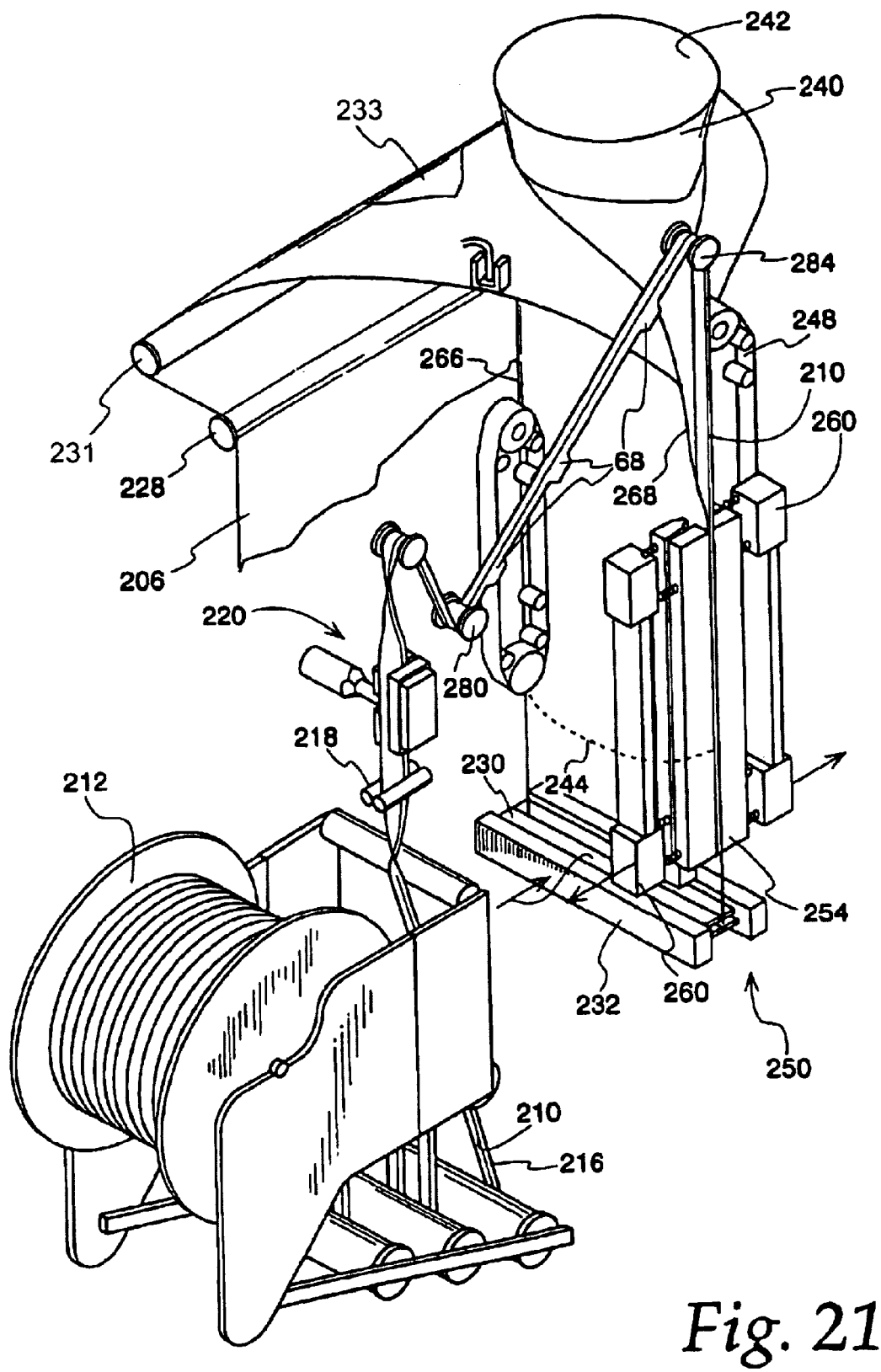
Figure 22:
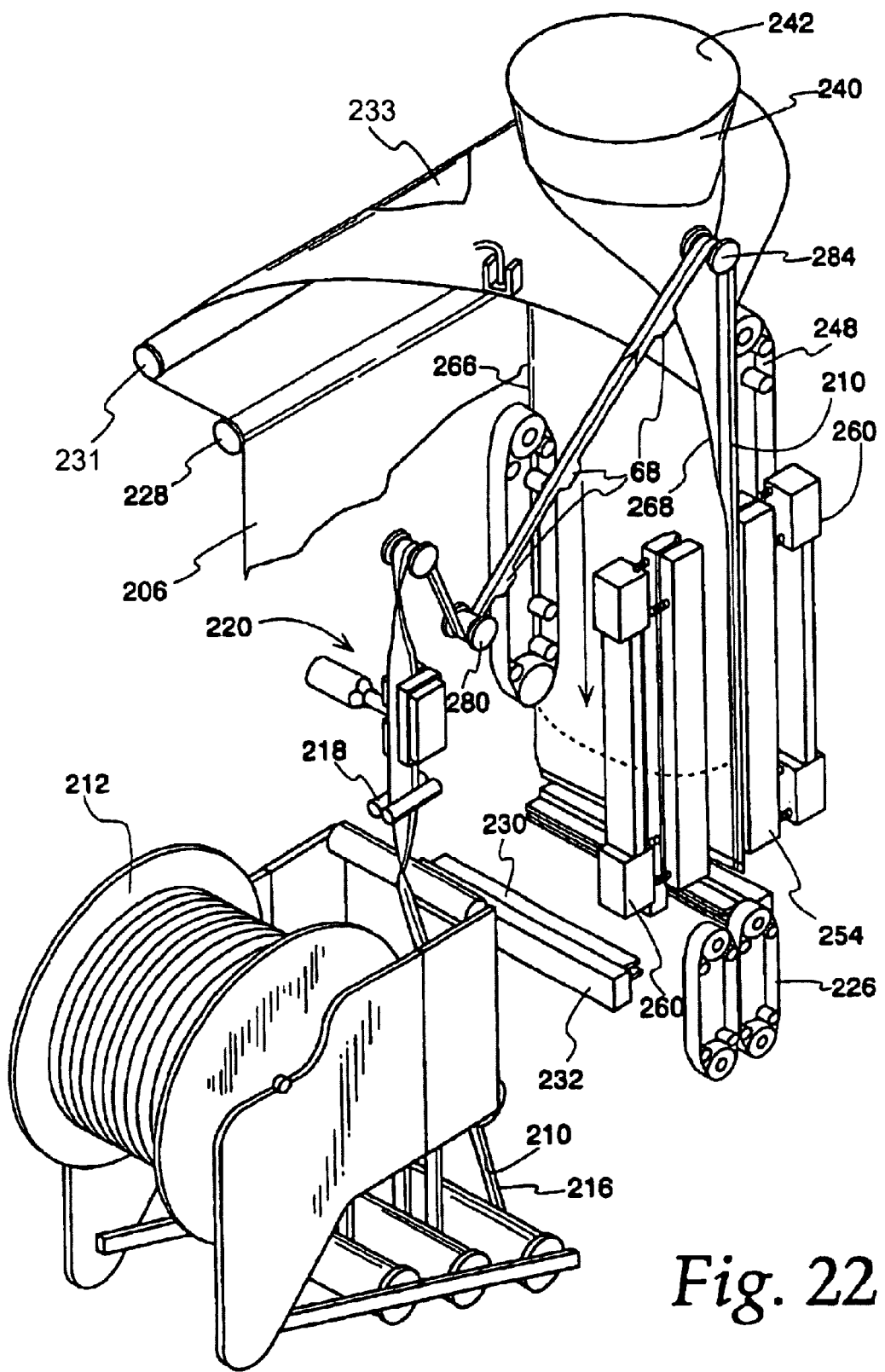
Figure 23:
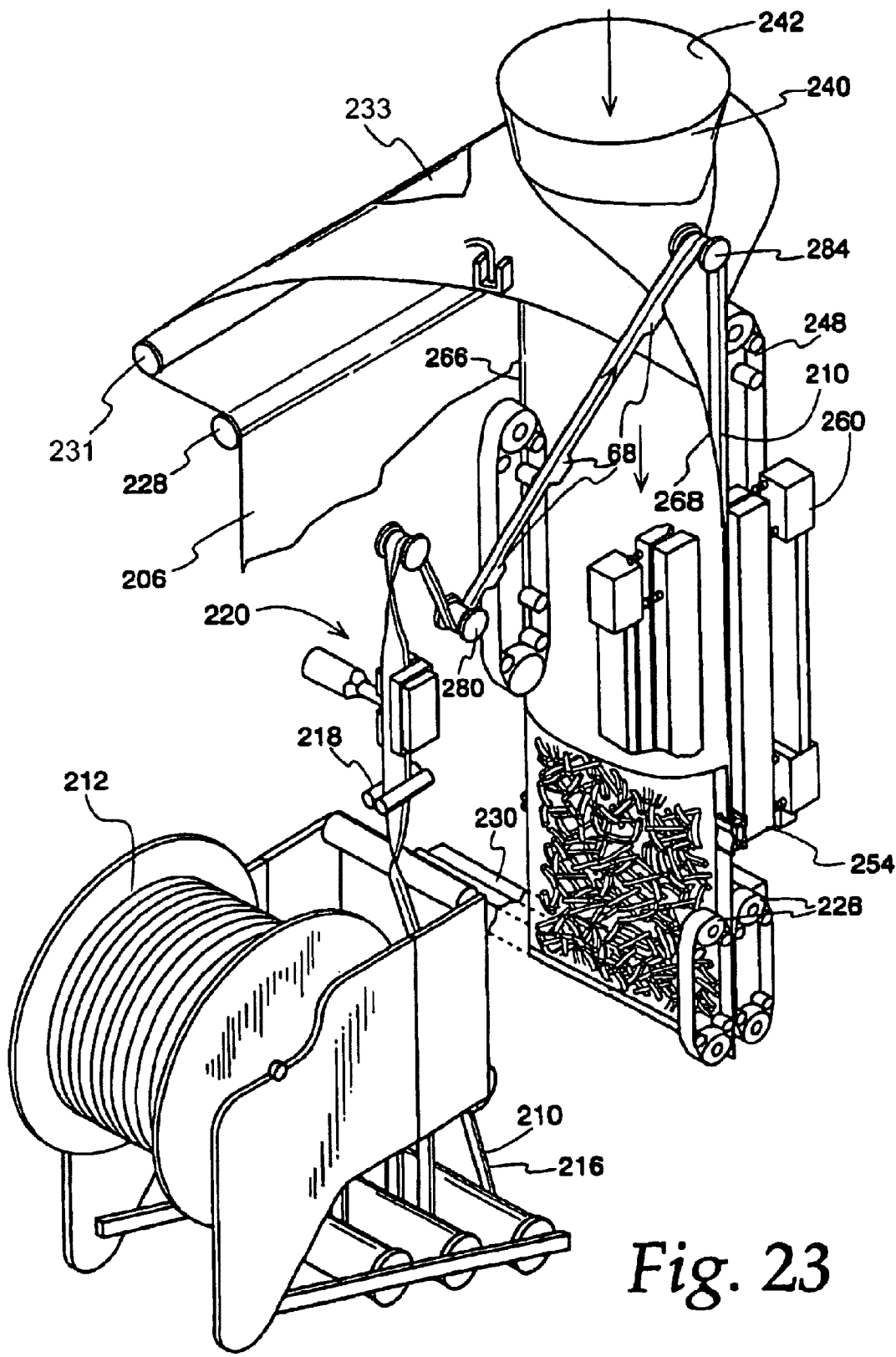
Figure 24:
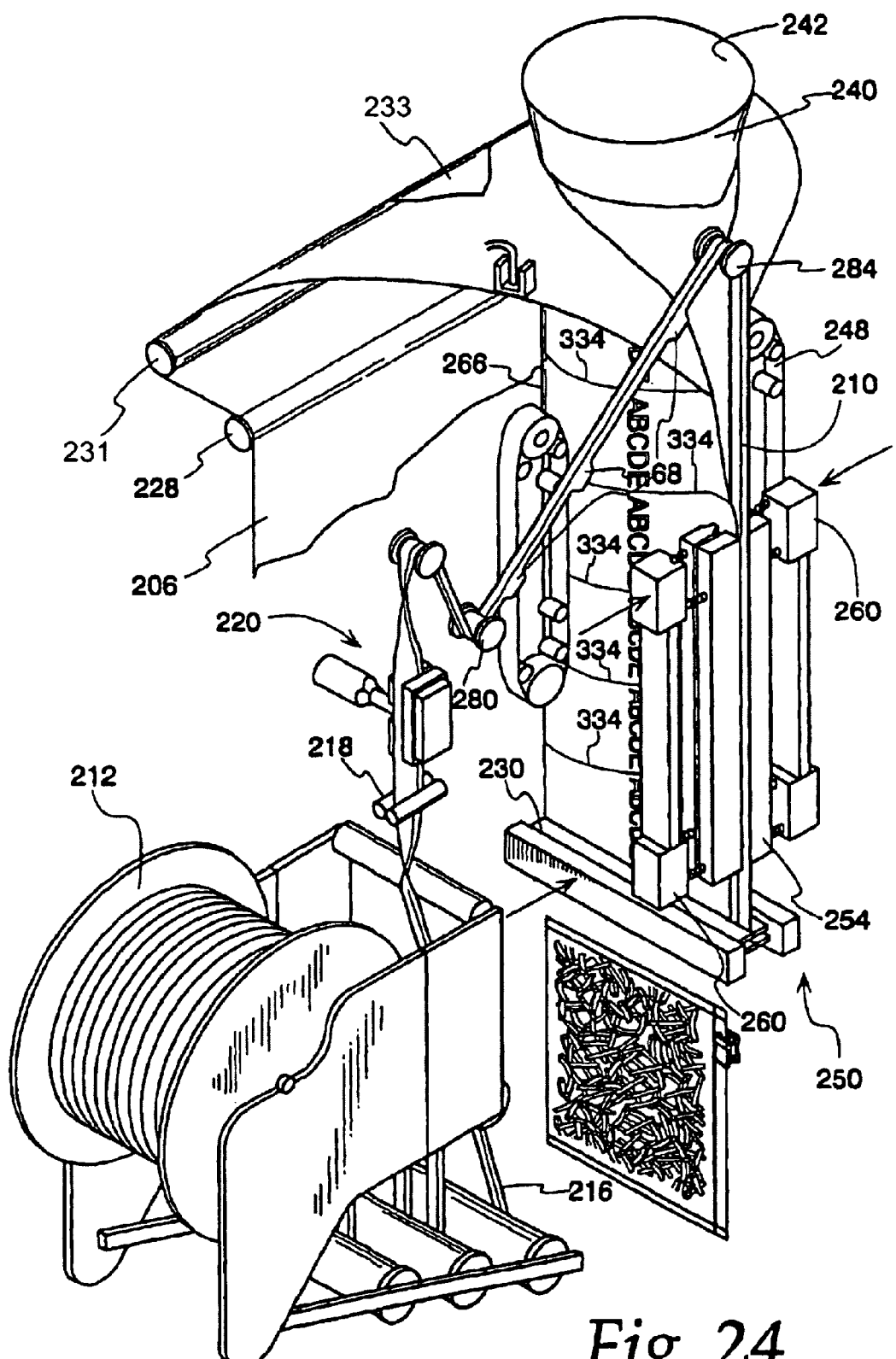

Referring to FIG. 21, after operation of the vertical seal bars, the vertical seal bars are opened in the direction indicated in FIG. 21 and horizontal actuators 232 are energized to draw horizontal seal bars 230 together. In an initial operation, during set up, the bottommost side seal of the first bag portion of the bag chain is formed. In the embodiment illustrated, for manufacture of flexible packages 10, the side seal 22 is formed after sealing is carried out by the vertical seal bars. With reference to FIG. 22 drive rollers 226 carry out a stepwise advance of the combined web material and fastener tracks. In a preferred embodiment, the step advance corresponds to the width of the finished flexible package (that is, the bag chain is lowered by an amount equal to one bag width). During the web advance or either immediately or shortly thereafter, contents are introduced into the flexible package as shown in FIG. 23. The peel seal has been omitted in FIG. 23 for drawing clarity. Package contents are preferably metered in a separate station (not shown) and fed through the upper open end 242 of mandrel 240.

Next, with the web material and fastener tracks having been advanced, the vertical seal bars are operated in the manner indicated above with respect to FIG. 20. Subsequently, as explained above with reference to FIG. 21 the vertical seal bars are retracted and horizontal seal bars provide a horizontal sealing operation, defining one bag portion with respect to another. The previously formed bag portion was filled through the trailing edge of the bag, and with the subsequent horizontal sealing step, the trailing side of the bag is then sealed to form a complete enclosure for product contained therein.

In one embodiment, with the manufacture of flexible package 10 shown in FIG. 1, the subsequent operation of horizontal sealing bars 230 form the left-hand side seal 20 shown in FIG. 1, to complete sealing of the bag contents. If desired, the web material could be advanced to a new location where the right-hand side seal of the next bag is formed, this however would result in a waste of a certain amount of web and fastener track material. In FIG. 1, the side seals of the sides of given bag are not identical to one another. It is preferred that apparatus 200 provide horizontal types of sealing bars containing tooling for a formation of both side seals of a flexible package and that the leading side seal of a package is formed at the same time the trailing side seal of its preceding neighboring bag portion is formed. This arrangement provides a reduction in machine cycle time and also reduces registration/alignment difficulties.

Figure 29:
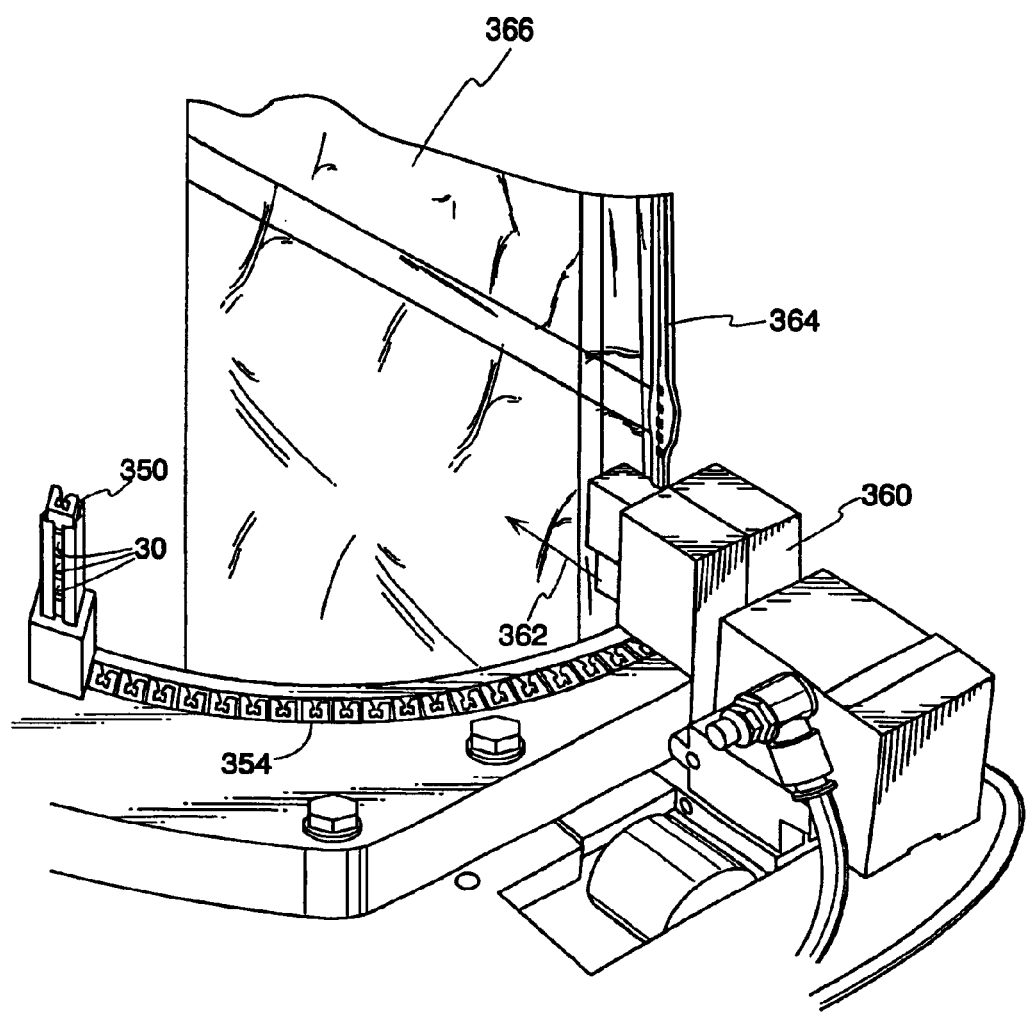
FIG. 29 is a fragmentary perspective view of a station for inserting a slider onto the bag.

Referring now to FIG. 29, a vertical stack of sliders 30 is accumulated in magazine 350. In the preferred embodiment, a stack or vertical array of seven sliders is accumulated in the magazine, being collected from a conventional vibrational feed bowl (not shown). As shown in FIG. 29, a curved or arcuate feed slot arrangement 354 is provided downstream of magazine 350. Preferably, contents of magazine 350 are dispensed in a continuous operation until the arcuate feed track 354 is filled in the manner shown. This brings a serial succession of sliders 30 to slider insertion device 360 which advances the sliders one at a time in a direction of arrow 362, inserting the sliders on the free edge 364 of the bag chain 366.

Preparation of the bag chain is carried out as a preliminary measure to slider insertion. With reference to FIGS. 25–27 a funnel device 370 is inserted over the free edge 364 of the bag chain 366. As seen for example in FIG. 26, funnel device 370 includes inclined walls which catch and (with insertion over the fastener tracks in the manner indicated in FIG. 27) cause the fastener tracks to rock or pivot about a vertical axis so as to assume a partially open position illustrated in FIG. 27. This opening allows the fasteners 30 to be inserted over the fastener tracks in a manner indicated in FIG. 28. Depending upon the fastener track material chosen and the degree of compression provided by the funnel device, so-called "activation" of the fastener tracks may not be necessary.

It is generally preferred that the sliders be inserted while the bottom or leading edge of the bag portion is clamped by the horizontal sealing bars. Accordingly, provision is made for inserting sliders on the bag portion in between the vertical and horizontal sealing bars located at sealing station 250. As indicated in FIG. 46, it is most preferred that the slider insertion mechanism 360 be located adjacent to the horizontal sealing bar, being spaced a fraction of the bag width above the sealing bar, so as to attain maximum rigidity from the clamping action provided. The fastener track material, however, may be soft or pliable so as to fail to provide a sufficient opening needed to receive the internal opening fin of the slider 30. A probe 374 may be employed to provide the needed opening to receive the internal fin member of the slider. The activation opening may be positioned in-line with the slider, or more preferably, it is located to one side of the slider. The activation opening is needed to receive the internal fin member of the slider so that, when an end user first operates the slider, the internal fin member is passed between the mated fastener tracks, causing their unmating, in an opening operation.

With reference to FIGS. 30–35 operation of the stop forming station 220 will be described. As shown in FIG. 30, a fastener track 210 is passed between an anvil 380 and a guide bar 382. An opening 384 is formed in guide bar 382 to allow an ultrasonic horn member 386 access to a defined segment of the mated fastener track. The ultrasonic sealing horn 386 has a horn face 388 which forms or displaces material of track 210 into the end stops 68 shown in idealized form in FIGS. 1 and 3, for example. As indicated in FIGS. 34 and 35, the ultrasonic sealing horn 386 is advanced in the direction of the indicated arrow and as shown in FIG. 35, applies pressure and frictional (ultrasonically included and residual) heating to the mated fastener tracks. It is preferred that horn face 388 act to press the mated fastener track against an anvil face which is shown in FIG. 30b.

Figure 30A:
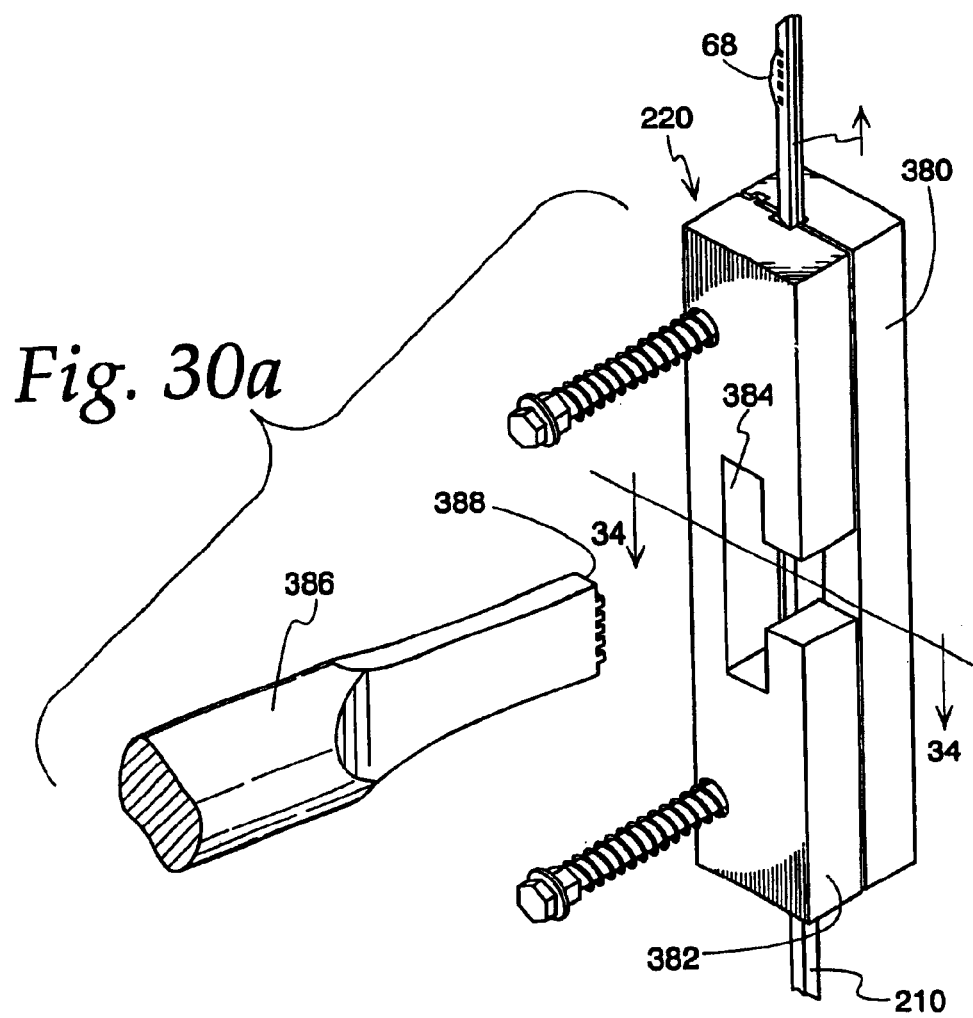
FIG. 30a is a fragmentary exploded perspective views of an ultrasonic horn and anvil assembly according to principles of the present invention.
Figure 30B:
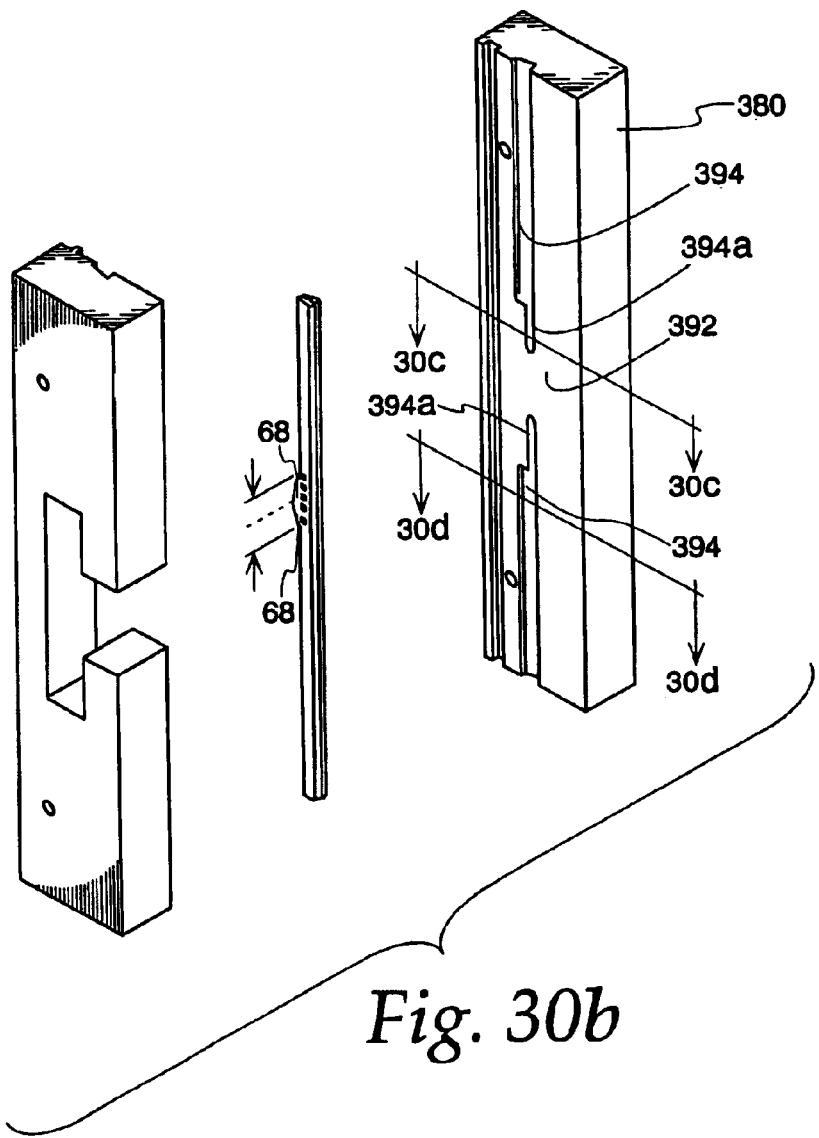
FIG. 30b is a fragmentary exploded perspective view of an anvil assembly with fastener tracks.
Figure 30C:
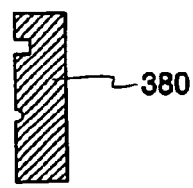
FIG. 30c is a cross-section view taken along the line 30c—30c of FIG. 30b.
Figure 30D:
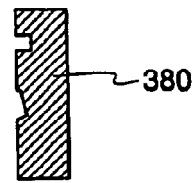
FIG. 30d is a cross-sectional view taken along the line 30d—30d of FIG. 30b.

With reference to FIG. 30b, the deformation of the fastener track by horn face 388 is carried out in a central portion 392 of anvil 380, located between spaced apart full width grooves 394 which effectively clamp the fastener track, holding it fixed in position. It is generally preferred that a pair of end stops be formed with a single operation of the ultrasonic horn, and that the end stops be positioned back-to-back in mirror image relationship. A portion of the fastener track is shown in the exploded view of FIG. 30b with the dash line indicating a cut line which will eventually severe one bag portion from another. The width of the combined end stops 68 indicated by dimension arrows in FIG. 30b is larger than the gap 392 and accordingly the horn face acts in concert with the preferred flat, featureless portion of anvil 380 and the reduced width groove portions 394a adjacent thereto. Unlike prior art arrangements forming end stops for sliders, the horn face and anvil of the present invention cooperate to produce a controlled flow of fastener track material, shifting the fastener track material to assume a precisely defined shape rather than to perform a simple flattening operation.

The ultrasonic horn face 388 is shown in the elevational view of FIG. 31 and cross-sectional view 32. Included in horn face 388 are a series of chisel-shaped outward projections 402, an outwardly extending wall portion 404 and recesses 406 located on either side of a lower flat surface portion 408. A prior art ultrasonic sealing horn 410 is shown in FIG. 33.

FIG. 35b shows an end stop 68 with line 35e—35e indicating the line of severing which separates one bag portion from another. FIGS. 35c and 35d are cross-sectional views showing the profile of the desired end stop shape. FIG. 35f shows the cross section FIG. 35c laid against a cross-section of the fastener track in its undeformed state.

FIGS. 34, 35a and 35f show the horn being applied to the fastener track 210, with FIG. 35f showing the final stage of operation.

The dimensions of the ultrasonic horn in FIGS. 31–33 is as follows:

| FIGS. No. | DIMENSION | VALUE (Inch) |
| --- | --- | --- |
| 31 | A | 0.50 |
| " | B | 0.11 |
| " | C | 0.25 |
| " | D | 0.238 |
| " | E | 0.40 |
| " | F | 0.886 |
| " | G | 0.138 |
| " | H | 0.10 |
| " | I | 0.088 |
| " | J | 0.092 |
| " | K | 0.069 |
| " | L | 0.076 |
| 32 | M | 0.048 |
| " | N | 0.065 |
| " | O | 0.10 |
| 33 | P | 1.50 |
| " | Q | 0.062 |
| " | R | 0.118 |
| " | S | 0.51 |
| " | T | 0.070 |
| " | U | 0.640 |

As can be seen from the comparison of the above, the ultrasonic horn according to principles of the present invention has a substantially smaller active surface area. Ultrasonic horns employed in the present invention produce substantially smaller end stops having smaller surface area and mass than prior end stops. The active surface area of the ultrasonic horn used to carry out the present invention has been found to dissipate or shed residual heat at an increased rate. As a result, deformation energy applied to the fastener track could produce a subsequent pair of back-to-back end stops as a total energy of an ultrasonic form, with the residual thermal energy being substantially reduced. This has been found to offer advantages in a high speed production environment. For example, end stops formed according to the present invention have a substantially improved, better defined shape and formation of end stops and a high speed production environment has been found to have greater reproducibility precision in the end stop manufacturing tolerances. With the present invention, end stops can be precisely formed with the flow of fastener track material being reshaped in a controlled manner.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed:

1. A form-fill seal machine for the in-line manufacturing of food packages having mated fastener tracks with slider closures, comprising:

a supply of web material extending in a machine direction package portions extending in the machine direction and having;

a supply of mated fastener tracks having a free edge;

a collar member receiving said web material;

a web drive transporting said web material over said collar in the machine direction, folding said web into overlying side-by-side portions, one against the other to form a continuous succession of package portions extending in the machine direction and having pairs of overlying package walls which include overlying free edges;

a pair of fastener seal bars extending in the machine direction sealing a portion of said fastener tracks to the package walls extending in the machine direction;

a pair of peel seal bars extending in the machine direction forming a peel seal between said package walls;

a supply of slider members mateable with said mated fastener tracks for movement along said mated fastener track in opposite directions to open and close said mated fastener tracks;

a fastener track activation member forming an initial opening in said mated fastener tracks to receive a portion of said slider member;

a slider installation member inserting said slider members onto said mated fastener tracks by pushing said slider members onto said mated fastener tracks adjacent the opening formed by said activation member;

said fastener track activation member comprising a funnel which is passed over the free edge of said mated fastener tracks to apply a compressive force at a point on said mated fastener tracks spaced from said mated fastener tracks free edge, to pivot said mated fastener tracks one against the other to form an opening at the free edge of said mated fastener tracks; and a pair of spaced-apart side seal bars extending at an angle to said machine direction, sealing portions of said package walls together to form respective side seals of the food package.

2. The machine of claim 1 wherein one of said side seal bars includes a tapered portion extending in the machine direction and located adjacent said fastener tracks.

3. The machine of claim 2 further comprising a heat sink plate which is supported from said collar.

4. The machine of claim 3 wherein said heat sink plate has the form of a metal finger and is metallurgically joined to said collar.

5. The machine of claim 1 wherein the mated fastener tracks include respective mounting flanges overlying one another and extending along the mated fastener tracks.

6. The machine of claim 5 wherein the mounting flanges extend from the fastener tracks different amounts, with one mounting flange having a greater height than the other, with the food package viewed in an upright position.

7. The machine of claim 6 wherein the fastener track seal bars seal free edge portions of said package walls to said respective mounting flanges.

8. The machine of claim 7 wherein said peel seal bars join one face of said mounting flange of greater height to a face of one of said package walls.

9. The machine of claim 1 wherein said web drive transports said web in a series of predetermined stepped amounts.

10. The machine of claim 9 further comprising a position sensor sensing the web position, located immediately adjacent said collar, the position sensor in communication with said web drive to control transport of said web material.

11. The machine of claim 1 wherein said collar forms a dead fold in said web extending in the machine direction with an opening between said package walls opposite said dead fold formed by said free edges.

12. The machine of claim 1 further comprising a curved accumulation track for receiving a plurality of said sliders arranged side-by-side in a serial succession.

13. The machine of claim 1 further comprising a registration device selectively applying tension to said mated fastener tracks to alter registration of said mated fastener tracks with respect to said web material.

14. The machine of claim 13 wherein said registration device comprises an idler roller engaging said mated fastener tracks and mounted for movement toward and away from a neutral position so as to alter tension applied to said mated fastener tracks.

15. The machine of claim 1 further comprising a stop forming station through which said mated fastener tracks pass, said stop forming station including cooperating horn and anvil members opposing the other on opposite sides of said mated fastener tracks, at least one of said horn and anvil members movable toward the other to crush a portion of said mated fastener tracks to form back-to-back slider stop members, and at least one of said horn and said anvil movable away from one another to release said mated fastener tracks at the conclusion of a crushing operation.

16. The machine of claim 15 wherein said web drive moves said mated fastener tracks in a series of discontinuous steps, so as to cooperate with said stop forming station to form a series of spaced-apart back-to-back slider stop members along said mated fastener tracks.

17. The machine of claim 1 further comprising a web position sensor mounted on said collar and connected to said web drive means to control operation of said web drive means.

18. The machine of claim 1 wherein said the fastener track seal bars and said peel seal bars are located beside one another.

19. The machine of claim 18 wherein said fastener track seal bars and said peel seal bars are generally coextensive with one another.

20. The machine of claim 1 further comprising a second pair of spaced-apart side seal bars located beside said one pair of spaced-apart side seal bars and cooperating therewith to form two adjacent, consecutive side seal's in said web material, associated with adjacent consecutive food package portions.

21. The machine of claim 1 wherein said mated fastener tracks have an A-shaped cross-section.

22. The machine of claim 1 further comprising a heat sink plate disposed between said package walls, and between said pair of fastener seal bars.

23. A form-fill seal machine for the in-line manufacturing of food packages having mated fastener tracks with slider closures, comprising:
   a supply of web material extending in a machine direction package portions extending in the machine direction and having;
   a supply of mated fastener tracks having a generally A-shaped cross section with a pair of opposed free edges;
   a collar member receiving said web material;
   a web drive transporting said web material over said collar in the machine direction, folding said web into overlying side-by-side portions, one against the other to form a continuous succession of package portions extending in the machine direction and having pairs of overlying package walls which include overlying free edges;
   a pair of fastener seal bars extending in the machine direction sealing a portion of said fastener tracks to the package walls extending in the machine direction;
   a pair of peel seal bars extending in the machine direction forming a peel seal between said package walls;
   a supply of slider members mateable with said mated fastener tracks for movement along said mated fastener track in opposite directions to open and close said mated fastener tracks;
   a slider installation member inserting said slider members onto said mated fastener tracks;
   a fastener track activation member comprising a funnel which is passed over the free edges of said mated fastener tracks to apply a compressive force at a point on said mated fastener tracks spaced from said mated fastener tracks free edge, to pivot said mated fastener tracks one against the other to form an opening between at least a portion of said mated fastener tracks; and
   a pair of spaced-apart side seal bars extending at an angle to said machine direction, sealing portions of said package walls together to form respective side seals of the food package.

24. The machine of claim 23 wherein said web drive transports said web in a series of predetermined stepped amounts.

25. The machine of claim 23 further comprising a position sensor sensing the web position, located immediately adjacent said collar, the position sensor in communication with said web drive to control transport of said web material.

* * * * *

UNITED STATES PATENT AND TRADEMARK OFFICE
CERTIFICATE OF CORRECTION

PATENT NO. : 6,941,722 B2
DATED : September 13, 2005
INVENTOR(S) : Kinigakis et al.

It is certified that error appears in the above-identified patent and that said Letters Patent is hereby corrected as shown below:

Column 19,
Line 61, change "said the fastener" to -- said fastener --.

Column 20,
Line 7, change "seal's" to -- seals --.

Signed and Sealed this

Twenty-eighth Day of March, 2006

JON W. DUDAS
*Director of the United States Patent and Trademark Office*